United States Patent
Iizuka et al.

(10) Patent No.: US 9,434,439 B2
(45) Date of Patent: Sep. 6, 2016

(54) VEHICLE

(71) Applicant: Yamaha Hatsudoki Kabushiki Kaisha, Iwata-shi, Shizuoka (JP)

(72) Inventors: Toshio Iizuka, Shizuoka (JP); Yosuke Hirayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/653,383

(22) PCT Filed: Dec. 20, 2013

(86) PCT No.: PCT/JP2013/084284
§ 371 (c)(1),
(2) Date: Jun. 18, 2015

(87) PCT Pub. No.: WO2014/098227
PCT Pub. Date: Jun. 26, 2014

(65) Prior Publication Data
US 2015/0344097 A1    Dec. 3, 2015

(30) Foreign Application Priority Data

Dec. 21, 2012  (JP) ................................. 2012-278878
Dec. 21, 2012  (JP) ................................. 2012-278879
Jul. 1, 2013   (JP) ................................. 2013-138481

(51) Int. Cl.
  *B62K 5/10*   (2013.01)
  *B62K 19/38*  (2006.01)
  (Continued)

(52) U.S. Cl.
  CPC ............... *B62K 5/10* (2013.01); *B62K 5/027* (2013.01); *B62K 5/05* (2013.01); *B62K 5/08* (2013.01);
  (Continued)

(58) Field of Classification Search
  CPC ............ B62K 5/05; B62K 5/08; B62K 5/10; B62K 5/027; B62K 25/08
  See application file for complete search history.

(56) References Cited

U.S. PATENT DOCUMENTS

D656,435 S      3/2012  Lambri et al.
2005/0012291 A1* 1/2005  Bagnoli .................. B62K 5/05
                                                      280/124.103
(Continued)

FOREIGN PATENT DOCUMENTS

EP   1 561 612 A1   8/2005
EP   2 213 536 A1   8/2010
(Continued)

OTHER PUBLICATIONS

Official Communication issued in International Patent Application No. PCT/JP2013/084284, mailed on Jan. 28, 2014.
(Continued)

*Primary Examiner* — Bryan Evans
(74) *Attorney, Agent, or Firm* — Keating and Bennett, LLP

(57) ABSTRACT

A vehicle includes a body frame that leans, two front wheels, a link mechanism, and a hydraulic unit. The link mechanism includes cross members and is supported on a link support portion of the body frame. The hydraulic unit is smaller than a cross member movable area where the cross members move relative to the body frame as seen from the direction of middle axes of the cross members. The hydraulic unit overlaps at least a portion of the cross member movable area and at least a portion of external vehicle components as seen from the direction of the middle axes and between the cross member movable area and the external vehicle components in relation to the direction of the middle axes. The hydraulic unit is supported on the link support portion of the body frame that supports the link mechanism.

14 Claims, 11 Drawing Sheets

(51) Int. Cl.
  *B62K 25/04* (2006.01)
  *B62K 5/05* (2013.01)
  *B62K 5/027* (2013.01)
  *B62K 5/08* (2006.01)
  *B62K 5/00* (2013.01)

(52) U.S. Cl.
  CPC .............. *B62K 19/38* (2013.01); *B62K 25/04* (2013.01); *B60G 2300/122* (2013.01); *B60G 2300/45* (2013.01); *B62K 2005/001* (2013.01)

(56) References Cited

U.S. PATENT DOCUMENTS

| | | |
|---|---|---|
| 2005/0167174 A1 | 8/2005 | Marcacci |
| 2006/0180372 A1 | 8/2006 | Mercier et al. |
| 2011/0275256 A1* | 11/2011 | Gibbs ................... B60F 3/0007 440/12.51 |

FOREIGN PATENT DOCUMENTS

| | | |
|---|---|---|
| EP | 2 368 729 A1 | 9/2011 |
| JP | 11-314589 A | 11/1999 |
| JP | 2010-228551 A | 10/2010 |

OTHER PUBLICATIONS

Piaggio, "Catalogo Parti Di Ricambio", NTRC000U01, MP3 300 ie LT Mod. ZAPM64102, 116 pages.

Official Communication issued in corresponding European Patent Application No. 13863762.4, mailed on Jan. 4, 2016.

Official Communication issued in corresponding European Patent Application No. 13863762.4, mailed on Dec. 15, 2015.

Hirayama; "Vehicle"; U.S. Appl. No. 14/901,375, filed Dec. 28, 2015.

* cited by examiner

VEHICLE

BACKGROUND OF THE INVENTION

1. Field of the Invention

The present invention relates to a vehicle that includes a hydraulic unit for use in an ABS.

2. Description of the Related Art

Vehicles including a body frame that can lean and two front wheels are known in Catalogo partidi ricambio, MP3 300 64102 ie LT Mod. ZAPM64102, Piaggio and the like. Such vehicles include a link mechanism at a front portion thereof. In these vehicles, the traveling direction of the vehicle is changed by causing a vehicle body to lean.

In these vehicles, a brake lever and a master cylinder are disposed at a left portion and a right portion of a handlebar. Pipes connected to the master cylinder at their ends pass from upper portions of side rods of the link mechanism through interiors of the side rods to be connected to calipers of a left front wheel and a right front wheel at the other ends.

In the vehicle described in Catalogo partidi ricambio, MP3 300 64102 ie LT Mod. ZAPM64102, Piaggio that includes the body frame that leans and the two front wheels, a front portion of the vehicle becomes large. This is attributed to the fact that the vehicle includes two steerable front wheels, that is, the right front wheel and the left front wheel and the link mechanism that supports the right front wheel and the left front wheel so as to be displaced relative to the body frame in an up-and-down direction of the body frame. With the body frame leaning with respect to a perpendicular direction, the members of the link mechanism move a large distance, and the right front wheel and the left front wheel are displaced a large distance relative to the body frame. This increases the size of an external vehicle component provided at the front portion of the vehicle so as to avoid interference with the link mechanism that moves a large distance and the right front wheel and the left front wheel that are displaced a large distance. As a result of this configuration, in the vehicle described in Catalogo partidi ricambio, MP3 300 64102 ie LT Mod. ZAPM64102, Piaggio that includes the body frame that leans and the two front wheels, the front portion of the vehicle becomes large.

It is desired that an ABS (Anti-lock Brake System) is mounted on the vehicle described in Catalogo partidi ricambio, MP3 300 64102 ie LT Mod. ZAPM64102, Piaggio that includes the body frame that leans and the two front wheels. In general, a hydraulic unit included in the ABS is heavier in weight and larger in volume among vehicle components on the vehicle, and therefore, the following problems are expected to occur.

In mounting the hydraulic unit on the vehicle, the rigidity of the support for the hydraulic unit needs to be ensured since the hydraulic unit is heavy. However, ensuring the rigidity of the support tends to enlarge or complex the supporting construction of the hydraulic unit.

Additionally, since the volume of the hydraulic unit is large, enlargement of the vehicle needs to be prevented by devising the positional relationship between the hydraulic unit and other vehicle components.

To make this happen, when attempting to mount an ABS on a vehicle like the one described in Catalogo partidi ricambio, MP3 300 64102 ie LT Mod. ZAPM64102, Piaggio that includes a body frame that leans and two front wheels, there are concerns that the vehicle is enlarged.

SUMMARY OF THE INVENTION

Preferred embodiments of the present invention provide a vehicle including a body frame that leans and two front wheels that prevents enlargement of the vehicle even though a hydraulic unit is mounted thereon.

A preferred embodiment of the present invention provides a vehicle including a body frame; a left front wheel and a right front wheel disposed in a left-and-right direction when seen from the front of the vehicle and configured to be steered; a rear wheel disposed behind the left front wheel and the right front wheel; a hydraulic brake system provided on any one of the right front wheel, the left front wheel, and the rear wheel; a left shock absorbing device that supports the left front wheel at a lower portion thereof and configured to absorb an upward displacement of the left front wheel in an up-and-down direction of the body frame; a right shock absorbing device that supports the right front wheel at a lower portion thereof and configured to absorb an upward displacement of the right front wheel in the up-and-down direction of the body frame; a link mechanism including a right side member that supports an upper portion of the right shock absorbing device so as to turn about a right steering axis that extends in the up-and-down direction of the body frame, a left side member that supports an upper portion of the left shock absorbing device so as to turn about a left steering axis parallel or substantially parallel to the right steering axis, and a plurality of cross members that support the right side member at right end portions thereof so as to turn about right axes that extend in a front-and-rear direction of the body frame, that support the left side member at left end portions thereof so as to turn about left axes parallel or substantially parallel to the right axes, and supported on a link support portion of the body frame at middle portions thereof so as to turn about middle axes parallel or substantially parallel to the right axes and the left axes; an external vehicle component of which at least a portion is disposed forward of or rearward of the link mechanism in the front-and-rear direction of the body frame and that defines at least a portion of an external surface of the vehicle; and a hydraulic unit configured to control a braking force of a hydraulic brake system; wherein the hydraulic unit is smaller than a cross member movable area where the plurality of cross members move relative to the body frame as seen from the direction of the middle axes, is disposed in a location that overlaps at least a portion of the cross member movable area and at least a portion of the external vehicle component as seen from the direction of the middle axes and between the cross member movable area and the external vehicle component in relation to the direction of the middle axes, and is supported on the link support portion of the body frame that supports the link mechanism.

According to the configuration described above, the hydraulic unit is smaller than the cross member movable area where the plurality of cross members move relative to the body frame as seen from the direction of the middle axes, and the hydraulic unit is disposed in a location that overlaps at least a portion of the cross member movable area and at least a portion of the external vehicle component as seen from the direction of the middle axes and between the cross member movable area and the external vehicle component in relation to the direction of the middle axes and is supported on the link support portion of the body frame that supports the link mechanism.

Incidentally, a hydraulic unit includes a plurality of components such as solenoid valves that control the fluid and a circuit board that controls the solenoid valves. This increases the volume and weight of the hydraulic unit to some extent, and in addition to this, these functions restrict the degree of freedom in designing the external shape of the hydraulic unit. In general, a hydraulic unit preferably has a rectangular or substantially rectangular parallelepiped configuration with few irregularities on an external surface thereof or a shape including a combination of a rectangular or substantially rectangular parallelepiped and a circular or substantially circular cylinder. Although a hydraulic unit includes fine irregularities on the external surface thereof, the hydraulic unit has no large irregularities thereon. Because of this, when arranging such a hydraulic unit, it is necessary to ensure a large space. A vehicle including a body frame that can lean and two front wheels is smaller than a four-wheeled vehicle. Therefore, when attempting to arrange the hydraulic unit on the vehicle including the body frame that can lean and the two front wheels, compared with a case where the hydraulic unit is disposed on a four-wheeled vehicle, there is a possibility that arranging the hydraulic unit on the vehicle enlarges the vehicle in size.

A study has been made on a mounting location of the hydraulic unit in the vehicle including the body frame that can lean and the two front wheels, that is, on a mounting location suitable for disposing a hydraulic unit that is large in volume and heavy in weight, has a limited degree of freedom in designing its external shape, and that has few irregularities on its external surface.

In the vehicle that includes the body frame that leans and the two front wheels, the front portion of the vehicle is large. This is attributed to the fact that the vehicle includes the two steerable front wheels, that is, the right front wheel and the left front wheel and the link mechanism that supports the right front wheel and the left front wheel so as to be displaced relative to the body frame in an up-and-down direction of the body frame. With the body frame leaning with respect to a perpendicular or substantially perpendicular direction, the members of the link mechanism move a large distance, and the right front wheel and the left front wheel are displaced a large distance relative to the body frame. This increases the size of an external vehicle component provided at the front portion of the vehicle so as to avoid interference with the link mechanism that moves a large distance and the right front wheel and the left front wheel that are displaced a large distance. As a result of this, in the vehicle that includes the body frame that leans and the two front wheels, the front portion of the vehicle is large. Because of this, it has been considered difficult to dispose the hydraulic unit at the front portion of the vehicle.

Moreover, the link mechanism that causes the body frame to lean is turnably supported on the body frame and moves relative to the body frame and the components fixed to the body frame. When the hydraulic unit is disposed on the periphery of the link mechanism, it becomes necessary to ensure a large space on the periphery of the link mechanism as a location to dispose the hydraulic unit in order to avoid interference of the hydraulic unit with the link mechanism, and this tends to enlarge the vehicle. Because of this, it is generally considered that enlargement of the vehicle caused by the placement of the hydraulic unit having a large volume and heavy weight and few irregularities on its external surface is restricted more by disposing the hydraulic unit close to a fixed member than by providing the hydraulic unit near a movable member of the link mechanism.

However, it has been discovered during an extensive study on the mounting location that the cross member movable area includes a flat or substantially flat surface perpendicular or substantially perpendicular to the middle axes, while an internal surface of the external vehicle component includes a complex surface with irregularities. It has been discovered that these surface configurations create a space between the cross member movable area including the flat or substantially flat surface and the internal surface of the external vehicle component including the irregularities. In addition, it has been discovered that the space defined between the flat or substantially flat surface of the cross member movable area and the internal surface of the external vehicle component including the irregularities is easily increased because the shapes of the flat or substantially flat surface and the internal surface are different. Further, it has also been discovered that since the cross member movable area includes a wide flat or substantially flat surface, it is difficult to use the space efficiently.

Then, a study was made on the possibility of disposing the hydraulic unit in the space between the flat or substantially flat surface of the link mechanism and the irregular internal surface of the external vehicle component.

According to the configuration described above, the hydraulic unit is smaller than the cross member movable area where the cross members move relative to the body frame as seen from the direction of the middle axes. Additionally, the hydraulic unit is disposed in a location where the hydraulic unit overlaps at least a portion of the cross member movable area and at least a portion of the external vehicle component as seen in the direction of the middle axes. The hydraulic unit is disposed between the cross member movable area of the cross member and the external vehicle component in relation to the direction of the middle axes. Further, the hydraulic unit is supported on the link support portion of the body frame that supports the link mechanism. The cross member movable area of the cross members is in a plane perpendicular or substantially perpendicular to the middle axes.

On the other hand, the internal surface of the external vehicle component includes the complex internal surface including the irregularities. This tends to increase the space between the link mechanism including the plane in the cross member movable area and the external vehicle component that includes the internal surface including the irregularities. Additionally, since the cross member movable area has the flat or substantially flat surface, it is difficult to use the cross member movable area efficiently.

The hydraulic unit having few irregularities on its external surface is smaller than the cross member movable area where the cross members move relative to the body frame as seen from the direction of the middle axes, and the hydraulic unit is disposed in the location that overlaps at least a portion of the cross member movable area and at least a portion of the external vehicle component as seen from the direction of the middle axes and between the cross member movable area and the external vehicle component in relation to the direction of the middle axes. Thus, even though the hydraulic unit is mounted on the vehicle, it is possible to prevent enlargement of the vehicle.

Moreover, the hydraulic unit is disposed in the space between the cross member movable area of the cross member and the external vehicle component and is supported on the link support portion that supports the link mechanism. The link support portion of the body frame bears loads inputted from the right front wheel and the left front wheel. Because of this, the link support portion of the body frame is highly rigid. By supporting the heavy hydraulic unit on the body frame, by making use of the high rigidity of the link support portion, the construction to enhance the rigidity of the body frame is simplified. This restricts the enlargement in size of the front portion of the vehicle.

Consequently, even though the hydraulic unit is mounted on the vehicle that includes the body frame that can lean and the two front wheels, it is possible to prevent enlargement of the vehicle.

According to another preferred embodiment of the present invention, the hydraulic unit is preferably disposed in a position closer to the middle axes than to the left end portions and to the right end portions of the cross members as seen from the direction of the middle axes.

According to the configuration described above, the cross members turn about the middle axes. Since the hydraulic unit is disposed in the position closer to the middle axes, it is difficult for the cross members to interfere with the supporting construction of the hydraulic unit when the cross members turn. This makes it easy to make the supporting construction of the hydraulic unit compact. Consequently, even though the hydraulic unit is mounted on the vehicle that includes the body frame that can lean and the two front wheels, it is possible to prevent enlargement of the vehicle.

According to another preferred embodiment of the present invention, the external vehicle component preferably includes an external surface of which a middle portion in a left-and-right direction of the body frame is farther forward or rearward than a right portion or a left portion in the front-and-rear direction of the body frame, and the hydraulic unit is preferably disposed between the cross member movable area and the external surface of the external vehicle component in relation to the direction of the middle axes.

According to the configuration described above, the external surface of the external vehicle component preferably has a convex shape, a concave shape, or a sloping surface in relation to the front-and-rear direction of the body frame so as to enhance the quality of the external appearance of the vehicle. Moreover, it is possible to prevent enlargement of the vehicle while enhancing the quality of the external appearance even though the hydraulic unit is mounted on the vehicle that includes the body frame that can lean and the two front wheels by disposing the hydraulic unit between the external surface of the external vehicle component having the convex shape, the concave shape, or the sloping surface in relation to the front-and-rear direction of the body frame and the cross member movable area that has the flat or substantially flat surface.

According to another preferred embodiment of the present invention, the external vehicle component preferably includes an external surface of which a middle portion in the up-and-down direction of the body frame is farther forward or rearward than an upper portion or a lower portion thereof in the front-and-rear direction of the body frame, and the hydraulic unit is preferably disposed between the cross member movable area and the external surface of the external vehicle component in relation to the direction of the middle axes.

According to the configuration described above, the external surface of the external vehicle component has a convex shape, a concave shape, or a sloping surface in relation to the front-and-rear direction of the body frame so as to enhance the quality of the external appearance of the vehicle. Moreover, it is possible to prevent enlargement of the vehicle while enhancing the quality of the external appearance even though the hydraulic unit is mounted on the vehicle that includes the body frame that can lean and the two front wheels by disposing the hydraulic unit between the external surface of the external vehicle component having the convex shape, the concave shape, or the sloping surface in relation to the front-and-rear direction of the body frame and the cross member movable area that has the flat or substantially flat surface.

According to another preferred embodiment of the present invention, the hydraulic unit preferably includes a first end surface that intersects the middle axes, that is closer to the cross member movable area than to the external vehicle component, and is wider than a second end surface that intersects the middle axes and that is closer to the external vehicle component than to the cross member movable area.

According to the configuration described above, the end surface closer the cross member movable area includes the wide flat or substantially flat surface, while the end surface closer to the external vehicle component is narrow, and therefore, the hydraulic unit is mounted on the vehicle while preventing enlargement of the vehicle.

According to another preferred embodiment of the present invention, the link mechanism preferably includes a tie-rod that turns together with a steering shaft and that transfers a turning motion of the steering shaft to the left front wheel and to the right front wheel, and the hydraulic unit is preferably located above the tie-rod as seen from the direction of the middle axes.

According to the configuration described above, it is difficult for the hydraulic unit to interfere with the tie-rod and the like when the vehicle is steered or is caused to lean.

According to another preferred embodiment of the present invention, a supporting length between the vertical frame and the link mechanism is preferably shorter than a supporting length between the hydraulic unit and the link support portion.

According to the configuration described above, the rigidity of the link mechanism, which is heavier than the hydraulic unit supported on the link support portion, is enhanced without the hydraulic unit interfering with the link mechanism.

According to another preferred embodiment of the present invention, the link support portion, the link mechanism, and the hydraulic unit are preferably aligned in this order in relation to the direction of the middle axes.

In general, the link mechanism has a larger volume than those of the link support portion and the hydraulic unit. Because of this, according to the configuration described above, when the link support portion, the link mechanism, and the hydraulic unit are aligned in this order, a space occupied by these members becomes rectangular or substantially rectangular as seen from an up-and-down direction perpendicular or substantially perpendicular to the turning axes. Because of this, consequently, spaces on left and right sides of the portion that protrude in a front-and-rear direction of this space are used for other applications. Consequently, even though the hydraulic unit is mounted on the vehicle that includes the body frame that can lean and the two front wheels, it is possible to prevent enlargement of the vehicle.

According to another preferred embodiment of the present invention, the hydraulic unit is preferably smaller than the link mechanism as seen from the up-and-down direction of the body frame.

According to the configuration described above, the space occupied by the link mechanism and the hydraulic unit is reduced, so that the spaces on the left and right sides of the portion that protrude in the front-and-rear direction of the space are used for other applications. Consequently, even though the hydraulic unit is mounted on the vehicle that includes the body frame that can lean and the two front wheels, it is possible to prevent enlargement of the vehicle.

According to another preferred embodiment of the present invention, the link support portion is preferably disposed between the link mechanism and the hydraulic unit in relation to the direction of the middle axes.

According to the configuration described above, the rigidity of the support for both the link mechanism and the hydraulic unit on the link support portion is enhanced without the hydraulic unit and the link mechanism interfering with each other.

According to another preferred embodiment of the present invention, the link mechanism is preferably larger than the link support portion and the hydraulic unit as seen from the up-and-down direction of the body frame.

According to the configuration described above, since the large link mechanism is disposed at an end in relation to the direction of the middle axes, a space occupied by the link support portion, the link mechanism, and the hydraulic unit is easily made into a triangular or substantially triangular shape as seen from the up-and-down direction perpendicular or substantially perpendicular to the direction of the middle axes, it is possible to effectively use the space at the front portion of the vehicle. Consequently, even though the hydraulic unit is mounted on the vehicle that includes the body frame that can lean and the two front wheels, it is possible to prevent enlargement of the vehicle.

According to another preferred embodiment of the present invention, as seen from the up-and-down direction of the body frame, the link mechanism is preferably larger than the hydraulic unit, and the hydraulic unit is preferably disposed either to the left or the right of the link support portion.

According to the configuration described above, the space occupied by the hydraulic unit, the link support portion, and the link mechanism is made as small as possible. Consequently, even though the hydraulic unit is mounted on the vehicle that includes the body frame that can lean and the two front wheels, it is possible to prevent enlargement of the vehicle.

According to another preferred embodiment of the present invention, the hydraulic unit is preferably disposed in an interior of an area occupied by the link mechanism and the link support portion in relation to the middle axes.

According to the configuration described above, the space occupied by the hydraulic unit, the link support portion, and the link mechanism is small in relation to the direction of the middle axes. Consequently, even though the hydraulic unit is mounted on the vehicle that includes the body frame that can lean and the two front wheels, it is possible to prevent enlargement of the vehicle.

According to another preferred embodiment of the present invention, the hydraulic unit is preferably disposed on a center line between a center line of the left front wheel and a center line of the right front wheel such that at least a portion thereof overlaps the center line as seen from the direction of the middle axes.

According to the configuration described above, it is difficult for the hydraulic unit to interfere with the link mechanism, the front wheels and the like when the vehicle is steered or caused to lean. Consequently, even though the hydraulic unit is mounted on the vehicle that includes the body frame that can lean and the two front wheels, it is possible to prevent enlargement of the vehicle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
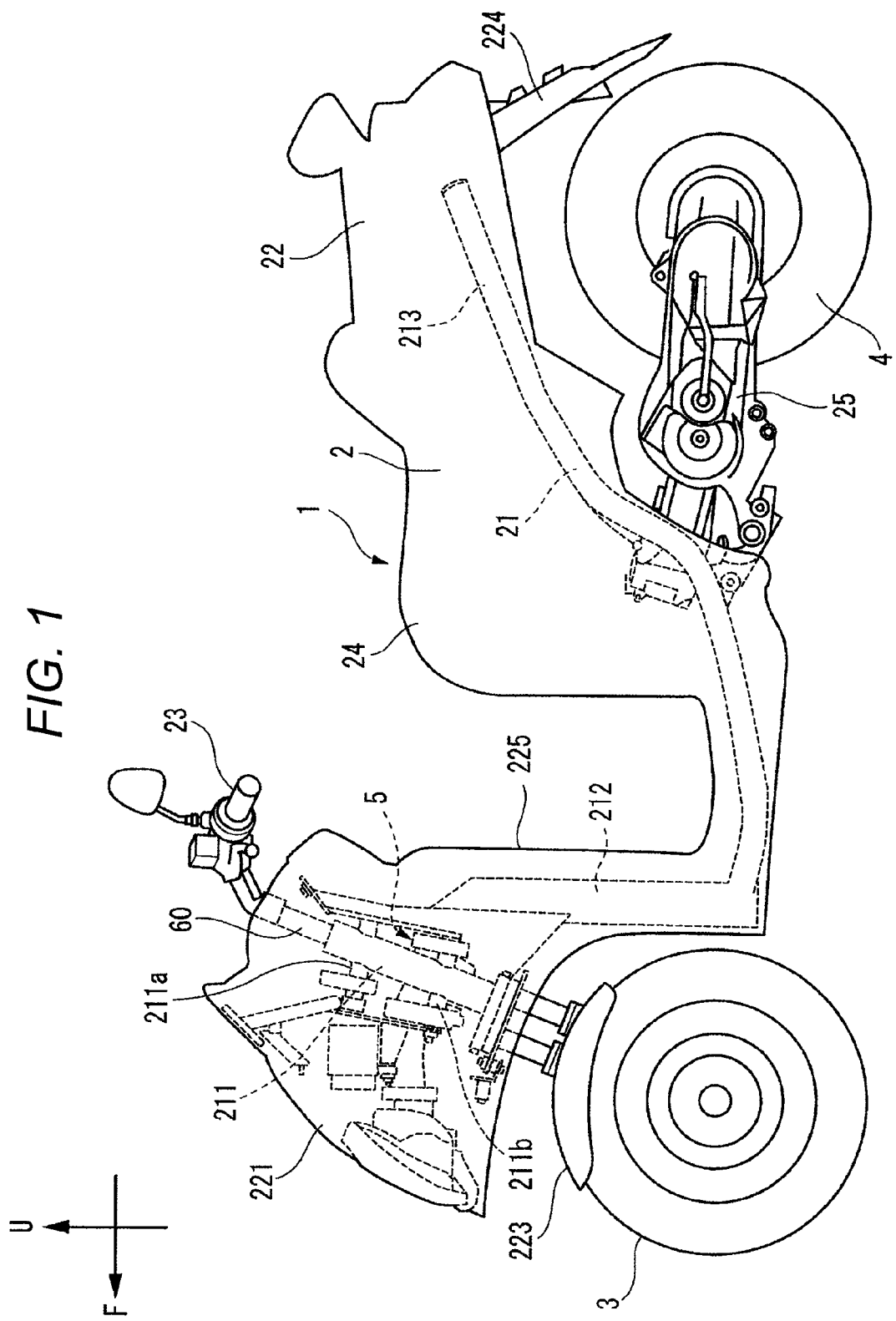
FIG. 1 is a left side view of a vehicle according to a preferred embodiment of the present invention.

Hereinafter, a vehicle 1 which is one type of vehicle according to a preferred embodiment of the present invention will be described by reference to the drawings. In the drawings, like reference numerals are given to like or corresponding portions and the description thereof will not be made repeatedly.

In the following description, an arrow F in the drawings denotes a forward direction of the vehicle 1. An arrow R in the drawings denotes a rightward direction of the vehicle 1. An arrow U denotes an upward direction. A widthwise or transversely middle position of the vehicle indicates a central position of the vehicle in a width or transverse direction thereof when the vehicle is seen from the front thereof. A widthwise lateral direction of the vehicle indicates a leftward or rightward direction as seen from the transversely middle position.

FIG. 1 is a schematic overall side view of the vehicle 1. In the following description, when front, rear, left, and right are referred to in indicating directions, they denote front, rear, left, and right directions as seen from a rider who rides on the vehicle 1.

The vehicle 1 includes a vehicle main body 2, front wheels 3, and a rear wheel 4. The vehicle main body 2 includes a body frame 21, a body cover 22, a handlebar 23, a seat 24, and a power unit 25.

The body frame 21 supports the power unit 25, the seat 24 and the like. The power unit 25 includes a power source such as an engine or an electric motor, a transmission and the like. In FIG. 1, the body frame 21 is shown by broken lines.

The body frame 21 includes a headstock 211 that extends in an up-and-down direction, a front frame 212 that extends from the headstock 211 to the rear, and a rear frame 213. The headstock 211 is disposed at a front portion of the vehicle. A link mechanism 5 is disposed on the periphery of the headstock 211. In the present preferred embodiment, the headstock 211 corresponds to a vertical frame, and the front frame 212 and the rear frame 213 correspond to a rear frame.

The headstock 211 is supported on the front frame 212. A steering shaft 60 is inserted into the headstock 211 so as to turn therein. The steering shaft 60 extends in an up-and-down direction. A first penetrating portion 211a and a second penetrating portion 211b protrude from the headstock 211 to the front so as to penetrate the link mechanism 5.

The handlebar 23 is mounted on an upper end of the steering shaft 60. The front frame 212 is inclined obliquely downward from a front end thereof to the rear. The rear frame 213 supports the seat 24 and a tail lamp.

The body frame 21 is covered by the body cover 22 as one of external vehicle components. The body cover 22 includes a front cover 221, front fenders 223, a rear fender 224, and a leg shield 225.

The front cover 221 is positioned forward of the seat 24. The front cover 221 covers at least a portion of the headstock 211 and the link mechanism 5.

The front fenders 223 are arranged individually directly above a pair of left and right front wheels 3. The front fenders 223 are disposed directly below the front cover 221. The rear fender 224 is disposed directly above the rear wheel 4.

The leg shield 225 is arranged behind the headstock 211. The leg shield 225 extends in the up-and-down direction. The leg shield 225 is disposed in front of the legs of a user who rides on the vehicle 1.

The front wheels 3 are disposed farther downward than the headstock 211 and the link mechanism 5. The front wheels 3 are disposed directly below the front cover 221.

Figure 2:
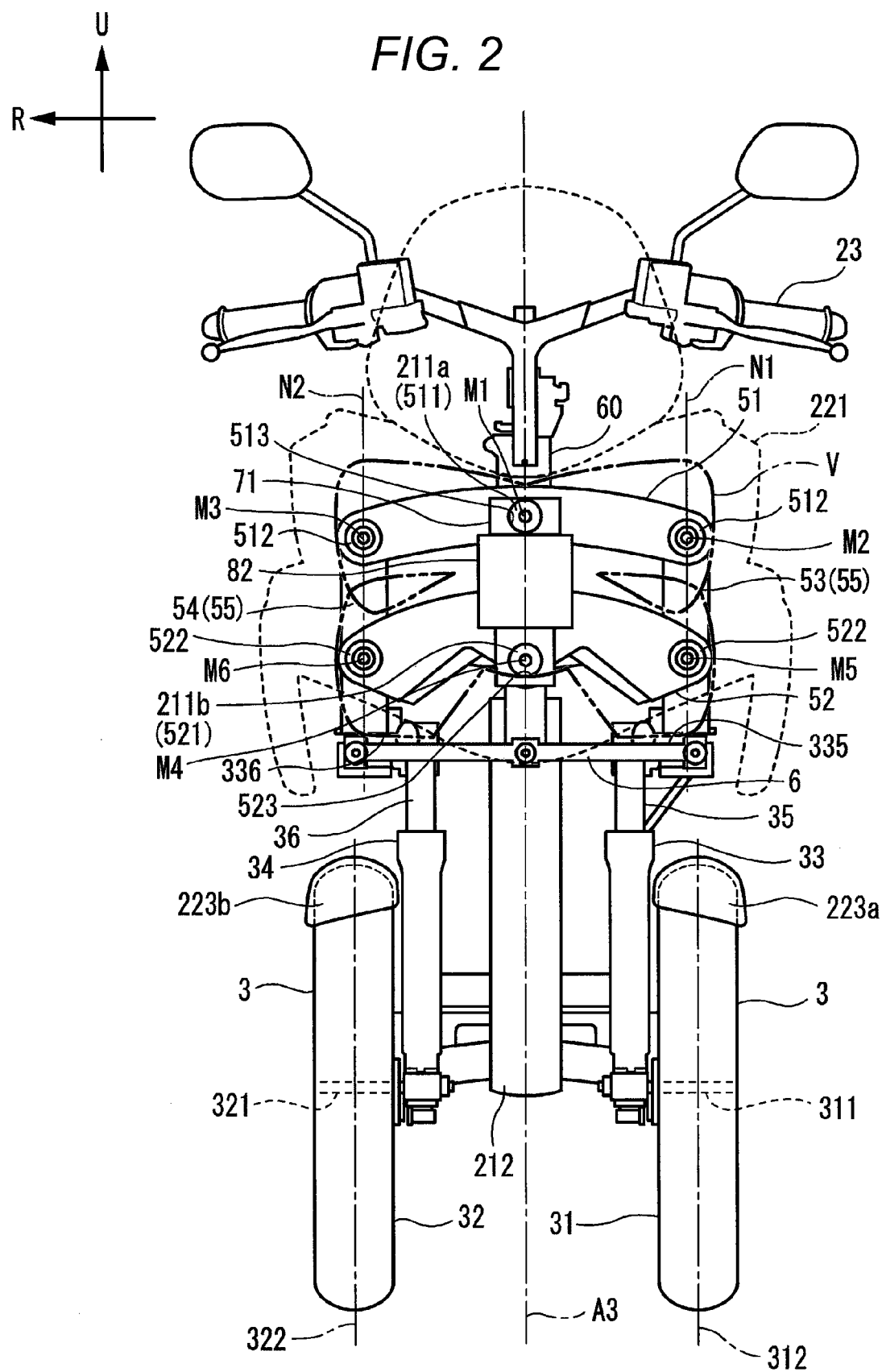
FIG. 2 is an overall front view of the vehicle shown in FIG. 1 with a body cover removed.
Figure 3:
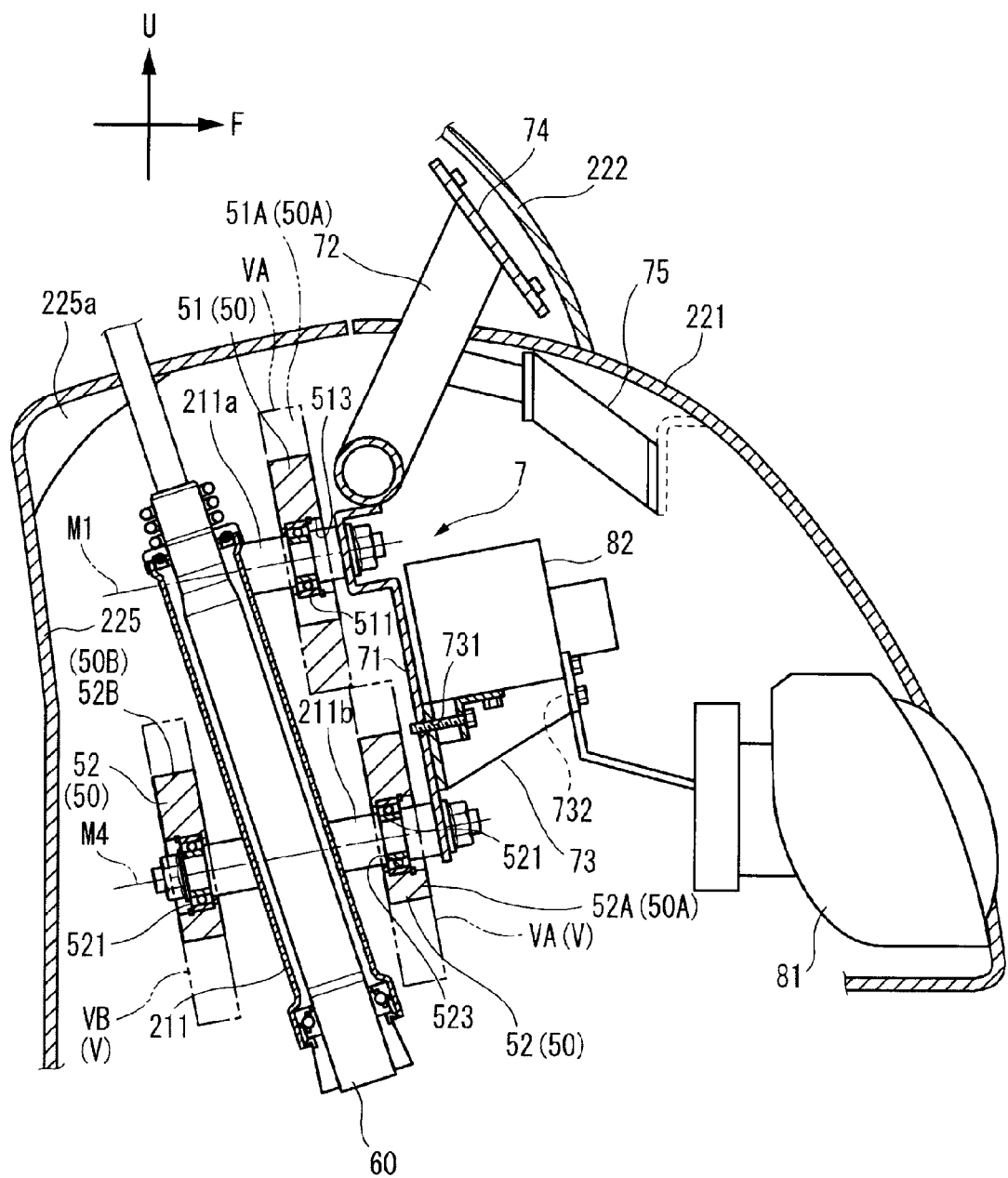
FIG. 3 is a sectional view of a front portion of the vehicle shown in FIG. 1 as seen from the right thereof.

FIG. 2 is an overall front view of the vehicle 1 with the body cover 22 removed. The vehicle 1 includes the handlebar 23, the steering shaft 60, the headstock 211, the pair of left and front wheels 3, and the link mechanism 5. The link mechanism 5 is disposed on the periphery of the headstock 211. The link mechanism 5 is connected to the pair of left and right front wheels 3, that is, a left front wheel 31 and a right front wheel 32. The link mechanism 5 is attached to the headstock 211 so as to turn thereon. As shown in FIGS. 2 and 3, the link mechanism 5 includes a cross member 50 and a side member 55. The cross member 50 includes an upper cross member 51 and a lower cross member 52. The cross member 50 includes a front cross member 50A located forward of the headstock 211 and a rear cross member 50B located rearward of the headstock 211. The upper cross member 51 includes a front upper cross member 51A located forward of the headstock 211. The lower cross member 52 includes a front lower cross member 52A located forward of the headstock 211 and a rear lower cross member 52B located rearward of the headstock 211. The front cross portion 50A includes a front upper cross member 51A and a front lower cross member 52A. The rear cross member 50B includes a rear lower cross portion 52B. The side member 55 includes a left side member 53 and a right side member 54.

The front wheels 3 include the left front wheel 31 and the right front wheel 32 that are configured to be steered. The left front wheel 31 is disposed to the left of a transversely middle portion of the vehicle. A first front fender 223a, which is one of the front fenders 223, is disposed directly above the left front wheel 31. The right front wheel 32 is disposed to the right of the transversely middle portion of the vehicle. A second front fender 223b, which is the other of the front fenders 223, is disposed above the right front wheel 32. The right front wheel 32 is preferably symmetric with the left front wheel 31 with respect to the transversely middle portion of the vehicle.

Figure 7:
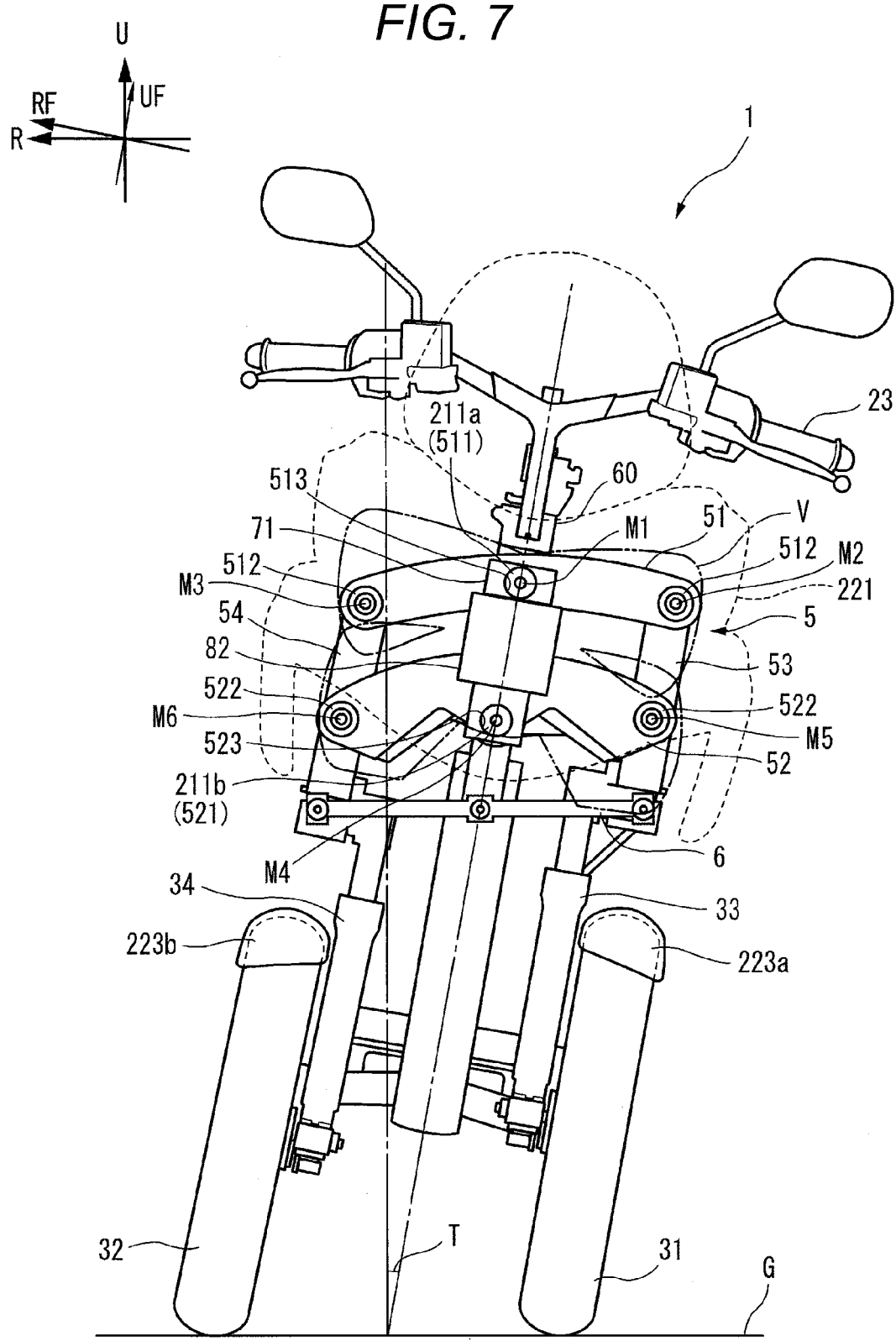
FIG. 7 is an overall front view showing a state in which the vehicle is caused to lean.

When referred to in this description, a "rightward direction RF of the body frame 21" denotes a rightward direction of directions that intersect an axial direction of the headstock 211 perpendicularly or substantially perpendicularly when the vehicle 1 is seen from the front thereof. Additionally, when referred to, an upward direction UF of the body frame 21 denotes an upward direction of the body frame 21 with the vehicle 1 resting upright. For example, the upward direction of the body frame 21 coincides with the axial direction of the headstock 211 when the vehicle 1 is seen from the front thereof. In such a state that the vehicle 1 rests in an upright state as shown in FIG. 2, the rightward direction RF of the vehicle body frame 21 coincides with a rightward direction R in the horizontal direction. Because of this, only the rightward direction R in the horizontal direction is shown in FIG. 2. In such a state that the vehicle 1 leans relative to a road surface G as shown in FIG. 7, the rightward direction RF of the body frame 21 does not coincide with the rightward direction R in the horizontal direction, and the upward direction UF of the body frame 21 does not coincide with an upward direction U in the perpendicular direction.

The left front wheel 31 is connected to a left shock absorber 33. The left front wheel 31 is connected to a lower portion of the left shock absorber 33. The left front wheel 31 rotates about a rotational shaft 311. The rotational shaft 311 extends in a left-to-right direction of the vehicle body frame 21. The left front wheel 31 turns about a turning axis 312. The vehicle 1 changes its traveling direction as a result of the left front wheel 31 turning about the turning axis 312.

The right front wheel 32 is connected to a right shock absorber 34. The right front wheel 32 is connected to a lower portion of the right shock absorber 34. The right front wheel 32 rotates about a rotational shaft 321. The rotational shaft 321 extends in the left-and-right direction of the body frame 21. The right front wheel 32 turns about a turning axis 322. The vehicle 1 changes its traveling direction as a result of the right front wheel 32 turning about the turning axis 322.

The left shock absorber 33 is configured to absorb an impact exerted on the left front wheel 31. The left shock absorber 33 is disposed below the link mechanism 5 in relation to the up-and-down direction of the body frame 21. The left shock absorber 33 is provided between the left side portion 53 and the left front wheel 31. The left shock absorber 33 extends along a left steering axis N1 that extends in a direction in which the steering shaft 60 and the headstock 211 extend. The left shock absorber 33 is disposed to the left of the headstock 211 in relation to the left-and-right direction of the body frame 21. The left shock absorber 33 is disposed to the right of the left front wheel 31 in relation to the left-and-right direction of the body frame 21.

The right shock absorber 34 is configured to absorb an impact exerted on the right front wheel 32. The right shock absorber 34 is disposed below the link mechanism 5 in relation to the up-and-down direction of the body frame 21. The right shock absorber 34 is provided between the right side portion 54 and the right front wheel 32. The right shock absorber 34 extends along a right steering axis N2 in which the steering shaft 60 and the headstock 211 extend. The right shock absorber 34 is disposed to the right of the headstock 211 in relation to the left-and-right direction of the body frame 21. The right shock absorber 34 is disposed to the left of the right front wheel 32 in relation to the left-and-right direction of the body frame 21.

The left side member 53 is disposed to the left of the headstock 211 in relation to the left-and-right direction of the body frame 21. The right side member 54 is disposed to the right of the headstock 211 in relation to the left-and-right direction of the body frame 21. The left side member 53 and the right side member 54 are preferably cylindrical or substantially cylindrical members.

The left side member 53 and the right side member 54 extend in the up-and-down direction of the body frame 21 with the vehicle resting in the upright state. A first bracket 335 is provided at a lower portion of the left side member 53, and the left shock absorber 33 is connected to the first bracket 335. The lower portion of the left side member 53 supports the left shock absorber 33 so as to turn about the left steering axis N1.

A second bracket 336 is provided at a lower portion of the right side member 54, and the right shock absorber 34 is connected to the second bracket 336. The lower portion of the right side member 54 supports the right shock absorber 34 so as to turn about the right steering axis N2.

The upper cross member 51 extends in the left-and-right direction of the body frame 21 as seen from the front of the vehicle. The upper cross member 51 is provided farther forward to the front of the vehicle than the headstock 211. A first through hole 513 is provided in a middle portion of the upper cross member 51 in the left-and-right direction of the body frame 21, and a pair of bearings, that is, an upper left bearing 512 and an upper right bearing 512 are provided at both sides of the upper cross member 51 in the left-and-right direction of the body frame 21. The first penetrating portion 211$a$ that extends from the headstock 211 penetrates through the first through hole 513.

FIG. 3 is a right side view of a front portion of the vehicle. As shown in FIG. 3, an upper middle bearing 511 is provided between the first penetrating portion 211$a$ and the first through hole 513. This allows the upper cross member 51 to be supported so as to turn relative to the headstock 211 by the first penetrating portion 211$a$ and the upper middle bearing 511. The upper cross member 51 turns about an upper middle axis M1 that defines the center of the upper middle bearing 511 relative to the headstock 211. The first through hole 513 includes the upper middle axis M1 of the upper cross member 51. This upper middle axis M1 is inclined relative to the horizontal direction so as to be slightly higher at the front.

The upper cross member 51 is connected to an upper portion of the left side member 53 and an upper portion of the right side member 54 via the upper left bearing 512 and the upper right bearing 512, respectively. This allows the upper cross member 51 to turn relative to the left side member 53 and the right side member 54. The upper middle axis M1 that defines a turning center of the upper middle bearing 511, an upper left axis M2 that defines a turning center of the upper left bearing 512, and an upper right axis M3 that defines a turning center of the upper right bearing 512 are parallel or substantially parallel to one another.

Returning to FIG. 2, the lower cross member 52 is located farther downward than the upper cross member 51. The lower cross member 52 extends in the left-and-right direction when seen from the front of the vehicle. A length in the left-and-right direction of the lower cross member 52 is equal or substantially equal to a length in the left-and-right direction of the upper cross member 51. The lower cross member 52 is located farther downward than the upper cross member 51. The lower cross member 52 includes two lower cross members provided so as to hold the headstock 211 therebetween from the front and the rear.

A second through hole 523 is provided in a transversely middle portion of the lower cross member 52, and a lower left bearing 522 is provided to the left of the second through hole 523, while a lower right bearing 522 is provided to the right of the second through hole 523. The second penetrating portion 211$b$ penetrates through the second through hole 523.

As shown in FIG. 3, a lower middle bearing 521 is provided between the second penetrating portion 211$b$ and the second through hole 523. This allows the lower cross member 52 to be supported so as to turn relative to the headstock 211 by the second penetrating portion 211$b$ and the lower middle bearings 521. The lower cross members 52 turn about a lower middle axis M4 that defines the center of the lower middle bearings 521 relative to the headstock 211. The second through holes 523 include the lower middle axis M4 of the lower cross members 52.

The lower middle axis M4 that defines a turning center of the lower middle bearing 521, a lower left axis M5 that defines a turning center of the lower left bearing 522, and a lower right axis M6 that defines a turning center of the lower right bearing 522 are parallel or substantially parallel to one another. Additionally, the lower middle axis M4 is parallel or substantially parallel to the upper middle axis M1. In addition, with the vehicle 1 resting in the upright state, a position of the lower left bearing 522 in the left-and-right direction of the body frame 21 is the same as a position of the upper left bearing 512 in the left-and-right direction of the body frame 21. With the vehicle 1 resting in the upright state, a position of the lower right bearing 522 in the left-and-right direction of the body frame 21 is the same as a position of the upper right bearing 512 in the left-and-right direction of the body frame 21.

The lower cross members 52 are connected to a lower portion of the left side member 53 and a lower portion of the right side member 54 via the lower left bearings 522 and the lower right bearings 522, respectively. This allows the lower cross members 52 to turn relative to the left side member 53 and the right side member 54.

Thus, by being configured in the manner described above, the link mechanism 5 is deformed within a plane that includes the upper cross member 51, the lower cross member 52, the left side member 53, and the right side member 54. It is noted that the link mechanism 5 is attached to the headstock 211. Because of this, even though the steering shaft 60 turns as the handlebar 23 is steered, the link mechanism 5 does not turn relative to the body frame 21.

Next, the tie-rod 6 will be described by reference to FIG. 2. The tie-rod 6 turns together with the steering shaft 60 and transfers the turning motion of the steering shaft 60 to the left front wheel 31 and to the right front wheel 32. By doing so, the left front wheel 31 and the right front wheel 32 is steered by the handlebar 23. The tie-rod 6 is located forward of the headstock 211. The tie-rod 6 extends in the left-and-right direction of the body frame 21. The tie-rod 6 is disposed below the lower cross members 52 and above the left front wheel 31 and the right front wheel 32. The tie-rod 6 is connected to a lower portion of the steering shaft 60. When the steering shaft 60 is turned, the tie-rod 6 moves laterally to the left or right.

As shown in FIG. 2, the first bracket 335 is provided at the lower portion of the left side member 53. The first bracket 335 is connected to the left shock absorber 33.

The first bracket 335 is configured to turn relative to the left side member 53. The tie-rod 6 is also arranged on the first bracket 335 so as to turn relative to the left side member 53. A turning axis around which the first bracket 335 turns relative to the left side member 53 and a turning axis around which the first bracket 335 turns relative to the tie-rod 6 are parallel or substantially parallel to the left steering axis N1 along which the left side member 53 extends.

The second bracket 336 is provided at the lower portion of the right side member 54. The second bracket 336 is connected to the right shock absorber 34. The second bracket 336 is configured to turn relative to the right side member 54. The tie-rod 6 is also arranged on the second bracket 336 so as to turn relative to the right side member 54. A turning axis around which the second bracket 336 turns relative to the right side member 54 and a turning axis around which the second bracket 336 turns relative to the tie-rod 6 are parallel or substantially parallel to the right steering axis N2 along which the right side member 54 extends.

When the steering shaft 60 turns as a result of the handlebar 23 being steered, the tie-rod 6 moves laterally to the left or right. Then, the first bracket 335 turns about the turning axis on which the first bracket 335 turns relative to the left side member 53 as the tie-rod 6 moves so. This moves a connecting portion 52b where the first bracket 335 connects to the left shock absorber 33 in the left-and-right direction, and the left front wheel 31 turns about the turning axis 312.

In this manner, the first bracket 335 transfers the steering motion of the handlebar 23 to the left front wheel 31. Similarly, the second bracket 336 transfers the steering motion of the handlebar 23 to the right front wheel 32.

As shown in FIG. 3, a hydraulic unit 82 of an ABS (Anti-lock Braking System) is provided between the upper cross member 51 of the link mechanism 5 of the upper cross member 51 and the front cover 221 in relation to the direction of the upper middle axis M1. The hydraulic unit 82 includes a metallic casing, a flow path provided in the casing, a pump, and solenoid valves, for example. The hydraulic unit 82 controls a brake system, not shown, by switching paths through which brake fluid flows by the solenoid valves. Reference numeral 81 in FIG. 3 denotes a headlamp.

Figure 4:
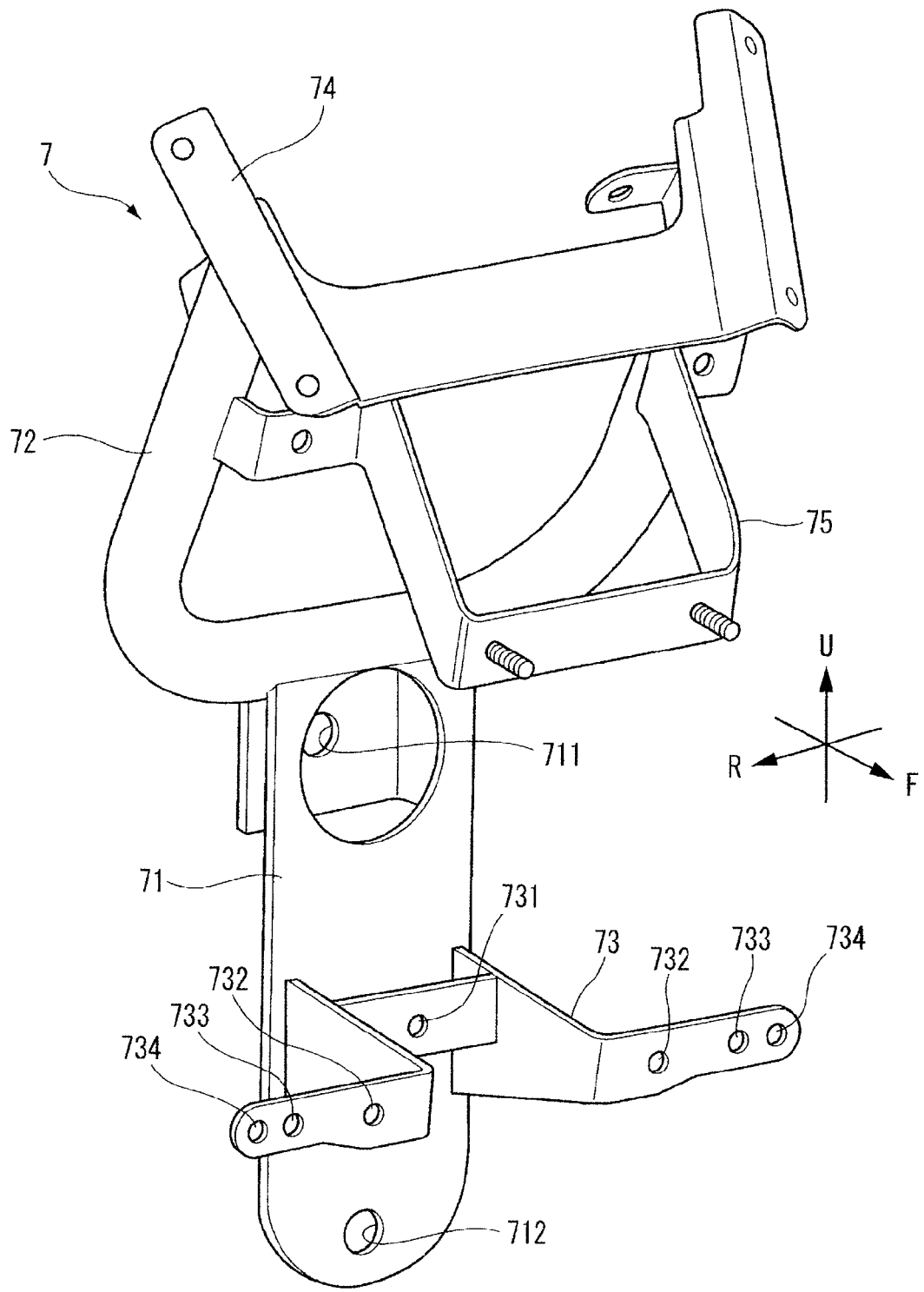
FIG. 4 is a perspective view of a support member.
Figure 5:
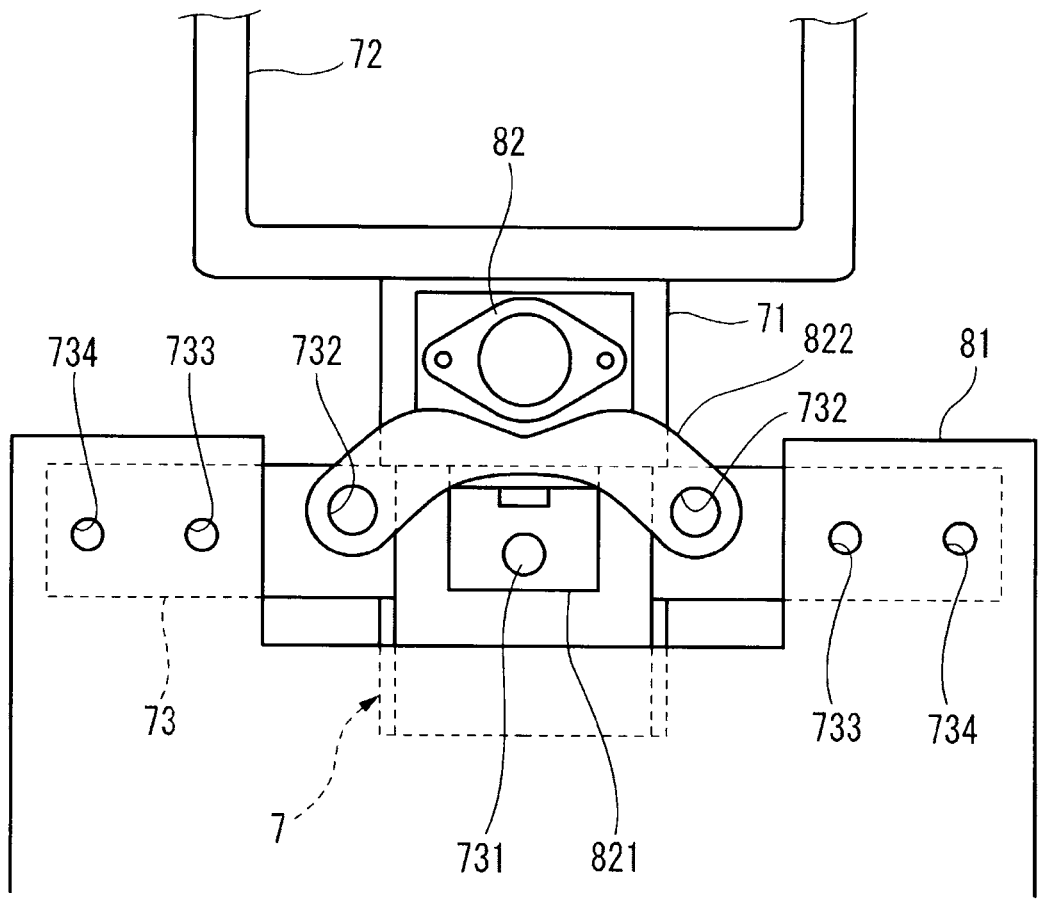
FIG. 5 is a front view showing an attaching bracket, a hydraulic unit, and a headlamp.
Figure 5:
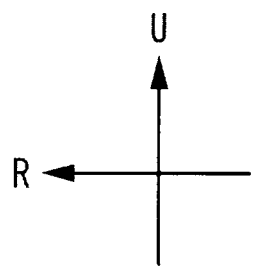

The headlamp 81 and the hydraulic unit 82 are supported on the headstock 211 via an attaching bracket 7. FIG. 4 is a perspective view of the attaching bracket 7. FIG. 5 is a front view showing the attaching bracket 7 and the hydraulic unit 82. As shown in FIGS. 4 and 5, the attaching bracket 7 includes an integral plate portion 71 and an extending portion 72 that extends obliquely from the plate portion 71.

As shown in FIG. 4, a first threaded hole 711 and a second threaded hole 712 are provided in the plate portion 71. A screw, for example, fixed to the first penetrating portion 211a extending from the headstock 211 is inserted through the first threaded hole 711. A screw, for example, fixed to the second penetrating portion 211b extending from the headstock 211 is inserted through the second threaded hole 712. This enables the attaching bracket 7 to be fixed to the headstock 211.

A first stay 73 is provided at a lower portion on a side of the plate portion 71 that faces the front of the vehicle. A third threaded hole 731 is provided in a middle portion of the first stay 73 in the left-and-right direction of the body frame 21. A pair of fourth threaded holes 732 are provided outward of the third threaded hole 731 in the left-and-right direction. A pair of fifth threaded holes 733 are provided outward of the pair of fourth threaded holes 732 in the left-and-right direction. A pair of sixth threaded holes 734 are provided outward of the pair of fifth threaded holes 733 in the left-and-right direction.

As shown in FIG. 5, a screw, for example, is screwed through the third threaded hole 731 in the first stay 73 to fix an attaching piece 821 of the hydraulic unit 82 in place. Screws, for example, are screwed through the fourth threaded holes 732 in the first stay 73 to fix an attaching piece 822 of the hydraulic unit 82 in place. The hydraulic unit 82 is fixed to the attaching bracket 7 by screwing the screws through the corresponding threaded holes.

The upper cross member 51 is supported on the headstock 211 by the upper middle bearing 511. A distance between the center of the upper middle bearing 511 that defines the connecting point where the upper cross member 51 and the headstock 211 are connected together and the center of the headstock 211 is defined herein as a link mechanism side supporting length.

In contrast with this, the hydraulic unit 82 is supported on the headstock 211 via the attaching bracket 7 by the screw inserted through the third threaded hole 731. A distance between the center of the third threaded hole 731 that defines the connecting point where the hydraulic unit 82 is connected to the headstock 211 and the center of the headstock 211 is defined as a hydraulic unit side supporting length. The link mechanism side supporting length is shorter than the hydraulic unit side supporting distance.

In particular, in the present preferred embodiment, the link mechanism 5, which is heavier than the hydraulic unit 82, is supported on the headstock 211 in a position that is closer to the headstock 211 than the hydraulic unit 82. This enhances the rigidity of the link mechanism 5.

Figure 6:
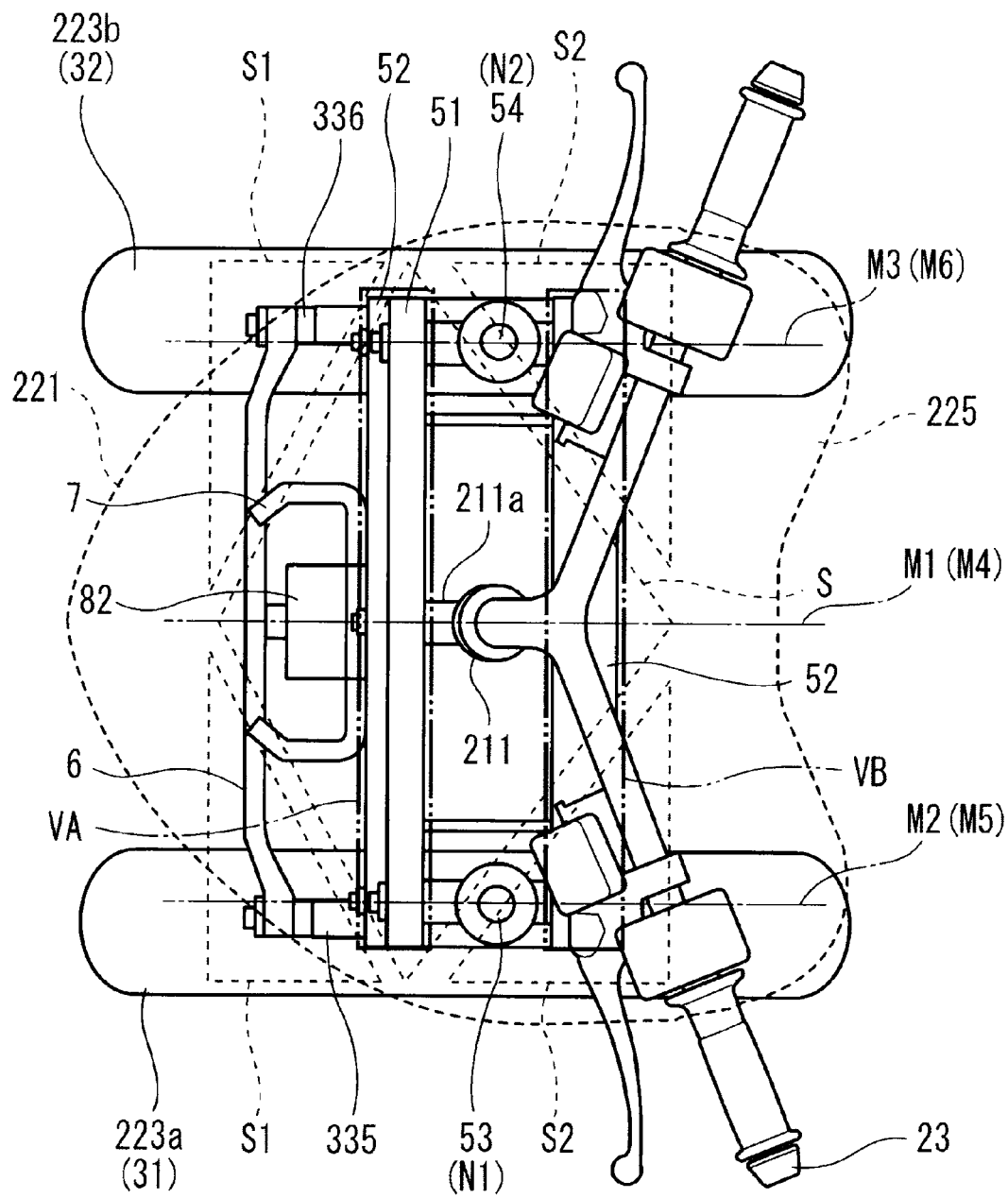
FIG. 6 is a view resulting when the front of the vehicle is seen from an up-and-down direction perpendicular or substantially perpendicular to the turning axes.

The headstock 211, the upper cross member 51 of the link mechanism 5, and the hydraulic unit 82 are aligned in this order from the rear in relation to the direction of the upper middle axis M1. As shown in FIG. 6, as seen from the up-and-down direction of the body frame 21, a dimension of the upper cross member 51 in the left-and-right direction of the body frame 21 is larger than the dimensions of the headstock 211 and the hydraulic unit 82. Because of this, when the headstock 211, the upper cross member 51 of the link mechanism 5, and the hydraulic unit 82 are arranged in this order, a space S occupied by these members defines a rhombic shape as seen from above in relation to the up-and-down direction of the body frame 21. This rhombic shape is shaped so that its dimension in the left-and-right direction becomes smaller as it extends from the upper cross member 51 to the front and rear in relation to the front-and-rear direction of the body frame 21. Consequently, spaces S1, S2 defined on left and right hand sides of portions of the space S that protrude to the front and rear from the upper cross member 51 (spaces occupied by the hydraulic unit 82 and the headstock 211) is able to be used for other applications.

Screws, for example, are screwed through the fifth threaded holes 733 and the sixth threaded holes 734 in the first stay 73 to fix the headlamp 81 in place. This enables the headlamp 81 to be fixed to the attaching bracket 7.

As shown in FIG. 4, a second stay 74 and a third stay 75 are provided at a distal end of the extending portion 72. As shown in FIG. 3, the windshield 222 is fixed to the second stay 74. The front cover 221 is fixed to the third stay 75.

In this manner, the hydraulic unit 82 is supported on the body frame 21 that supports the link mechanism 5 via the attaching bracket 7. The attaching bracket 7 is fixed to the first penetrating portion 211a and the second penetrating portion 211b that protrude to the front from the headstock 211 to penetrate through the link mechanism 5.

FIG. 7 is an overall front view of the vehicle 1 in which the vehicle body is caused to lean at an angle T in the left-and-right direction with respect to the perpendicular direction from the state shown in FIG. 2. When the link mechanism 5 is actuated, the vehicle 1 leans with respect to the perpendicular direction.

As this occurs, the upper cross member 51 and the lower cross members 52 are translated in the horizontally left-and-right direction while the direction in which they extend is kept parallel or substantially parallel to the road surface G. The upper cross member 51 and the lower cross members 52 turn about the upper left axis M2 of the upper left bearing 512 and the lower left axis M5 of the lower left bearings 522, respectively, relative to the left side portion 53. The upper cross member 51 and the lower cross members 52 also turn about the upper right axis M3 of the upper right bearing 512 and the lower right axis M6 of the lower right bearings 522, respectively, relative to the right side portion 54.

When the vehicle is seen from the front in the direction of the upper middle axis M1, with the vehicle resting in the upright state, the upper cross member 51, the lower cross member 52, the left side member 53, and the right side member 54 define a rectangular or substantially rectangular shape and are deformed when the vehicle is caused to lean. Then, as the vehicle is caused to lean further, the upper cross member 51, the lower cross member 52, the left side member 53, and the right side member 54 are deformed into a parallelogram shape. In the following description, when seen from a direction parallel or substantially parallel to an upper middle axis A1 of the upper cross member 51 and a lower middle axis A2 of the lower cross member 52, an area that includes the upper cross member 51, the lower cross member 52, the left side member 53, and the right side member 54 and defined inside the parallelogram defined by these four members will be called an operating space of the link mechanism 5.

In the present preferred embodiment, the link mechanism 5 operates so that a left end of the upper cross member 51 moves farther leftward than a left end of the lower cross member 52 in the left-and-right direction of the body frame 21. When the link mechanism 5 operates in this manner, the left shock absorber 33 and the right shock absorber 34 lean with respect to the perpendicular direction. When the vehicle 1 leans to the left with respect to the perpendicular direction in the manner described above, the state of the vehicle 1 changes from the state shown in FIG. 2 to the state shown in FIG. 7.

The vehicle 1 according to the present preferred embodiment is turned by causing the vehicle body to lean to the left or right while the vehicle 1 is running. Additionally, the directions of the left front wheel 31 and the right front wheel 32 are also changed by operating the handlebar 23.

An area where the upper cross member 51 and the lower cross members 52 pass through the body frame 21 when the vehicle is caused to lean to the left or right to its maximum extent will be called a cross member movable area V (refer to FIGS. 2 and 7) where the cross member 50 is able to move. As shown in FIG. 3, the cross member movable area V of the cross member 50 includes a front cross member movable area VA where the front cross member 50A that includes the front upper cross member 51A and the front lower cross member 52A is able to move relative to the body frame 21 and a rear cross member movable area VB where the rear cross member 50B that includes the rear lower cross member 52B is able to move relative to the body frame 21.

As shown in FIG. 2, as seen from the direction of the middle axes, the hydraulic unit 82 is smaller than the cross member movable area V of the cross member 50 where the upper cross member 51 and the lower cross members 52 are able to move relative to the body frame 21.

Additionally, as shown in FIG. 2, the hydraulic unit 82 is disposed in a position where the hydraulic unit 82 overlaps at least a portion of the cross member movable area V of the cross member 50 and at least a portion of the front cover 221 as seen in the direction of the upper middle axis M1. In addition, as shown in FIG. 3, the hydraulic unit 82 is disposed between the cross member movable area V of the cross member 50 and the front cover 221 in relation to the direction of the upper middle axis M1 and is supported on the headstock 211 of the body frame 21 that supports the link mechanism 5.

The vehicle 1 according to a preferred embodiment described above preferably includes the body frame 21; the left front wheel 31 and the right front wheel 32 disposed in the left-and-right direction as seen from the front of the vehicle 1 and that is configured to be steered; the rear wheel 4 disposed behind the left front wheel 31 and the right front wheel 32; a brake system (an example of a hydraulic brake system) provided on any one of the left front wheel 31, the right front wheel 32, and the rear wheel 4; the left shock absorber 33 that supports the left front wheel 31 at the lower portion thereof and is configured to absorb the upward displacement of the left front wheel 31 in the up-and-down direction of the body frame 21; the right shock absorber 34 that supports the right front wheel 32 at the lower portion thereof and is configured to absorb the upward displacement of the right front wheel 32 in the up-and-down direction of the body frame 21; the link mechanism 5; the front cover 221 (an example of an external vehicle component) of which at least a portion is disposed forward of or rearward of at least the link mechanism 5 in the front-and-rear direction of the body frame 21 and that defines at least a portion of an external surface of the vehicle; and the hydraulic unit 82 configured to control a braking force of the brake system.

The link mechanism 5 preferably includes the right side member 54 that supports the upper portion of the right shock absorber 34 so as to turn about the right steering axis N2 that extends in the up-and-down direction of the body frame 21; the left side member 53 that supports the upper portion of the left shock absorber 33 so as to turn about the left steering axis N1 parallel or substantially parallel to the right steering axis N2; and the upper cross member 51 and the lower cross members 52 (an example of a plurality of cross members) that support the right side member 54 at the right end portions thereof so as to turn about the right axes (the upper right axis M3 and the lower right axis M6) that extend in the front-and-rear direction of the body frame 21, that supports the left side member 53 at the left end portions thereof so as to turn about the left axes (the upper left axis M2 and the lower left axis M5) parallel or substantially parallel to the right axes, and that is supported on the headstock 211 (an example of a link support portion) of the body frame 21 at the middle portions thereof so as to turn about the middle axes (the upper middle axis M1 and the lower middle axis M4) parallel or substantially parallel to the right axes and the left axes.

The hydraulic unit 82 is smaller than the cross member movable area V of the cross member 50 that includes the upper cross member 51 and the lower cross members 52 where the upper and lower cross members turn relative to the body frame 21 as seen from the direction of the middle axes.

The hydraulic unit 82 is disposed in a position that overlaps at least a portion of the cross member movable area V of the cross member 50 and at least a portion of the front cover 221 as seen from the direction of the middle axes and between the cross member movable area V of the cross member 50 and the external vehicle component such as the front cover 221 in relation to the direction of the middle axes and is supported on the headstock 211 of the body frame 21 that supports the link mechanism 5. More specifically, the hydraulic unit 82 is disposed between the front cross member movable area VA and the front cover 221 in relation to the direction of the middle axes. Additionally, the hydraulic unit 82 is disposed between the rear cross member movable area VB and the front cover 221 in relation to the direction of the middle axes.

Incidentally, the hydraulic unit 82 includes a plurality of components such as solenoid valves that control a fluid and a circuit board that controls the solenoid valves. In addition to the fact that the hydraulic unit 82 is large in volume and heavy in weight, these functions limit the degree of freedom in designing the external shape of the hydraulic unit 82. In general, the hydraulic unit 82 preferably has a rectangular or substantially rectangular parallelepiped shape with few irregularities on the external surface thereof or a shape including a combination of a rectangular or substantially rectangular parallelepiped and a circular or substantially circular cylinder. Although including fine irregularities, the hydraulic unit 82 includes few large irregularities on the external surface thereof. Because of this, when disposing the hydraulic unit 82, it is necessary to ensure a large space on the vehicle. A vehicle including a body frame that can lean and two front wheels is smaller than a four-wheeled vehicle. Therefore, when attempting to arrange the hydraulic unit on the vehicle including the body frame that can lean and the two front wheels, compared with a case where the hydraulic unit is disposed on the four-wheeled vehicle, there is a possibility that the hydraulic unit enlarges the vehicle in size.

Then, the inventor of the preferred embodiments of the present invention has studied a mounting location of the hydraulic unit in the vehicle including the body frame 21 that can lean and the two front wheels, that is, a mounting location suitable to dispose the hydraulic unit 82 that is large in volume and heavy in weight, that has a limited degree of freedom in designing its external shape, and that includes few irregularities on its external surface.

Firstly, a vehicle that includes the body frame 21 that leans and the two front wheels 31, 32 has a large front portion. This is attributed to the fact that the vehicle includes the two steerable front wheels 3, that is, the right front wheel 32 and the left front wheel 31 and the link mechanism 5 that supports the right front wheel 32 and the left front wheel 31 so as to be displaced relative to the body frame 21 in an up-and-down direction of the body frame 21. With the body frame 21 leaning with respect to the perpendicular direction, the cross member 50 and the side member 55 of the link mechanism 5 move a large distance, and the right front wheel 32 and the left front wheel 31 are displaced a large distance relative to the body frame 21. This increases the size of external vehicle components such as the front cover 221 provided at the front portion of the vehicle so as to avoid interference with the link mechanism 5 that moves a large distance and the right front wheel 32 and the left front wheel 31 that are displaced a large distance. As a result of this, the vehicle that includes the body frame 21 that leans and the two front wheels 31, 32 has a large the front portion. Based on this fact, the inventor considered that mounting the hydraulic unit at the front portion of the vehicle further increases enlargement of the front portion of the vehicle.

Moreover, the link mechanism 5 is supported on the body frame 21 so as to turn relative thereto and moves relative to the body frame 21 and the components fixed to the body frame 21. When the hydraulic unit 82 is disposed on the periphery of the link mechanism 5, it becomes necessary to ensure a large space on the periphery of the link mechanism 5 as a space where to dispose the hydraulic unit 82 in order to avoid interference of the hydraulic unit 82 with the link mechanism 5, and this has caused the inventor to consider that the front portion of the vehicle is enlarged. Because of this, the inventor considered that enlargement of the front portion of the vehicle caused by the placement of the hydraulic unit 82 that is large in volume and heavy in weight and that has few irregularities on its external surface is reduced by disposing the hydraulic unit 82 closer to a fixed member than by providing the hydraulic unit 82 closer to a movable member of the link mechanism 5. In a vehicle that has a large front portion and includes the body frame 21 that leans and the two front wheels 31, 32, the inventor considered it difficult to dispose the hydraulic unit 82 at the front portion of the vehicle.

However, the inventor discovered during intensive studies on the mounting location that the cross member movable area V of the cross member 50 is a flat or substantially flat surface perpendicular or substantially perpendicular to the middle axes M1, M4 as shown in FIGS. 3 and 6, while an internal surface of external vehicle components such as the front cover 221 have a complex surface including irregularities. From this, the inventor discovered that these surface configurations create a space between the cross member movable area V of the cross member 50 including a flat or substantially flat surface and the internal surface of the front cover 221 including the irregularities. In addition, the space between the flat or substantially flat surface of the cross member movable area V of the cross member 50 and the irregular internal surface of the front cover 221 tends to be large due to the shapes of the two surfaces being different from each other. In addition to this, the cross member movable area V of the cross member 50 has a wide flat or substantially flat surface. From these facts, the inventor discovered that it is difficult to utilize this space.

Then, the hydraulic unit 82 is disposed between the flat or substantially flat surface of the cross member movable area V of the cross member 50 and the irregular internal surface of the front cover 221. This is based on a technical idea that the disadvantage that the space is eventually created between the link mechanism 5 and the front cover 221 and the disadvantage of the hydraulic unit 82 that the hydraulic unit 82 generally has an external surface with few irregularities is canceled out by a combination of these disadvantages.

According to the vehicle 1 of the present preferred embodiment, as shown in FIG. 2, as seen from the direction of the middle axes, the hydraulic unit 82 is smaller than the cross member movable area V of the cross member 50 that includes the upper cross member 51 and the lower cross members 52 where the cross member 50 is able to move relative to the body frame 21. Additionally, the hydraulic unit 82 is disposed in a position where the hydraulic unit 82 overlaps at least a portion of the cross member movable area V and at least a portion of the front cover 221 as seen in the direction of the middle axes. As shown in FIG. 3, the hydraulic unit 82 is disposed between the front cross member movable area VA of the front cross member 50A and the front cover 221 in relation to the direction of the middle axes. Additionally, the hydraulic unit 82 is disposed between the cross member movable area VB of the rear cross member 50B and the front cover 221 in relation to the direction of the middle axes. Further, the hydraulic unit 82 is supported on the headstock 211 of the body frame 21 that supports the link mechanism 5. The cross member movable area V of the cross member 50 includes the plane perpendicular or substantially perpendicular to the middle axes.

On the other hand, the internal surface of the external vehicle component such as the front cover 221 includes a complex internal surface with irregularities in many cases. For example, as shown in FIG. 3, the front cover 221 includes the internal surface in which, in relation to the up-and-down direction of the body frame 21, a middle portion is located farther forward than an upper portion or a lower portion in the front-and-rear direction of the body frame 21. Alternatively, as shown in FIG. 6, the front cover 221 includes an internal surface in which, in relation to the left-and-right direction of the body frame 21, a middle portion is located farther forward than a left portion or a right portion in the front-and-rear direction of the body frame 21. Additionally, a rib 225a is provided at an upper portion of the body cover that is located at the rear of the body frame 21 to support an instrument panel, and this rib 225a ensures the rigidity of the instrument panel. An internal surface of the portion of the body cover has a shape that expands toward the rear. Alternatively, on the internal surface of the instrument panel, terminals and the like protrude toward the front. This tends to increase the space between the link mechanism 5 including the flat or substantially flat surface at the cross member movable area V of the cross member 50 and the external vehicle component that includes the irregular internal surface. Additionally, since the cross member movable area V of the cross member 50 includes the flat or substantially surface, it is difficult to efficiently use this space.

The hydraulic unit 82 having a shape that has few irregularities on its external surface is made smaller than the cross member movable area V of the cross member 50 that includes the upper cross member 51 and the lower cross members 52 where the cross member 50 is able to move relative to the body frame 21 as seen from the direction of the middle axes, and the hydraulic unit 82 is disposed in a position that overlaps at least a portion of the cross member movable area V and at least a portion of the front cover 221 as seen from the direction of the middle axes and between the cross member movable area V and the cross member 50 and the external vehicle component (the front cover 221) in relation to the direction of the middle axes. Thus, the hydraulic unit 82 is mounted on the vehicle 1, while preventing the enlargement thereof.

Moreover, the hydraulic unit 82 is disposed in the space defined between the cross member movable area V of the cross member 50 and the external vehicle component 221 and is supported on the headstock 211 of the body frame 21 that supports the link mechanism 5. The headstock 211 of the body frame 21 bears loads inputted from the right front wheel 32 and the left front wheel 31. Because of this, the headstock 211 of the body frame 21 is highly rigid. When supporting the hydraulic unit 82 that is heavy on the body frame 21, by making use of the high rigidity of the headstock 211, the construction to enhance the rigidity of the body frame 21 is simplified. This prevents the enlargement in size of the front portion of the vehicle 1.

Consequently, even though the hydraulic unit 82 is mounted on the vehicle that includes the body frame 21 that can lean and the two front wheels 31, 32, it is possible to prevent enlargement of the vehicle.

In addition, in the present preferred embodiment, as shown in FIG. 2, the hydraulic unit 82 is supported on the headstock 211 and is supported on the attaching bracket 7 that is located in a middle portion in the left-and-right direction of the body frame 21. Because of this, the hydraulic unit 82 is disposed on a center line between a center line A3 (refer to FIG. 2) of the left front wheel 31 and a center line of the right front wheel 32 so that at least a portion thereof overlaps the center line as seen from the direction of the upper middle axis M1. This prevents the hydraulic unit 82 from interfering with the link mechanism 5, the left front wheel 31, and the right front wheel 32 even though the vehicle is turned or caused to lean. Consequently, it is possible to provide a vehicle on which the hydraulic unit 82 is mounted without increasing the size of the vehicle.

In addition, in the present preferred embodiment, the hydraulic unit 82 is supported on the attaching bracket 7 forward of the upper cross member 51. Because of this, the hydraulic unit 82 is provided higher than the tie-rod 6 in the up-and-down direction of the body frame 21 as seen from the direction of the upper middle axis M1. Since the left front wheel 31 and the right front wheel 32 are lower than the tie-rod 6 in the up-and-down direction of the body frame 21, even though the vehicle is turned or is caused to lean, there is no situation in which the hydraulic unit 82 interferes with the left front wheel 31 and the right front wheel 32. Consequently, it is possible to provide a vehicle on which the hydraulic unit 82 is mounted without increasing the size of the vehicle.

According to the vehicle 1 of the present preferred embodiment, as shown in FIG. 2, the hydraulic unit 82 is disposed in a position closer to the upper middle axis M1 (or the lower middle axis M4) than to the left end portion and the right end portion of the upper cross member 51 or the left end portions and the right end portions of the lower cross members 52 as seen from the direction of the upper middle axis M1.

The upper cross member 51 and the lower cross members 52 turn about the upper middle axis M1 and the lower middle axis M4, respectively. Since the hydraulic unit 82 is disposed in a position located close to the upper middle axis M1 or the lower middle axis M4, when the upper cross member 51 and the lower cross members 52 turn, it is difficult for the upper cross member 51 and the lower cross members 52 to interfere with the construction supporting the hydraulic unit 82. This makes it easy to make the construction supporting the hydraulic unit 82 compact.

According to the vehicle 1 of the present preferred embodiment, as shown in FIG. 6, the front cover 221 (an example of an external vehicle component) includes the external surface in which, in relation to the left-and-right direction of the body frame 21, the middle portion is located farther forward or rearward than the right portion or the left portion in the front-and-rear direction of the body frame. The hydraulic unit 82 is disposed between the cross member movable area V of the cross member 50 and the front cover 221 in relation to the direction of the middle axis M1.

According to the configuration described above, the external surface of the front cover 221 preferably has a convex shape, a concave shape, or a sloping surface in relation to the front-and-rear direction of the body frame 21 so as to enhance the quality of the external appearance of the vehicle 1. Moreover, it is possible to prevent enlargement of the vehicle while enhancing the quality of the external appearance even though the hydraulic unit 82 is mounted on the vehicle 1 that includes the body frame 21 that can lean and the two front wheels by disposing the hydraulic unit 82 between the external surface of the front cover 221 with the convex shape, the concave shape, or the sloping surface in relation to the front-and-rear direction of the body frame 21 and the cross member movable area V of the cross member 50 that has a flat or substantially flat surface.

According to the vehicle 1 of the present preferred embodiment, as shown in FIG. 3, the front cover 221 includes the external surface in which, in relation to the up-and-down direction of the body frame 21, the middle portion is located farther forward or rearward than the upper portion or the lower portion in the front-and-rear direction of the body frame 21. The hydraulic unit 82 is disposed between the cross member movable area V of the cross member 50 and the front cover 221 in relation to the direction of the middle axis M1.

According to the configuration described above, the external surface of the front cover 221 preferably has the convex shape, the concave shape, or the sloping surface in relation to the front-and-rear direction of the body frame 21 so as to enhance the quality of the external appearance of the vehicle 1. Moreover, it is possible to prevent enlargement of the vehicle while enhancing the quality of the external appearance even though the hydraulic unit 82 is mounted on the vehicle 1 that includes the body frame 21 that can lean and the two front wheels by disposing the hydraulic unit 82 between the external surface of the front cover 221 with the convex shape, the concave shape, or the sloping surface in relation to the front-and-rear direction of the body frame 21 and the cross member movable area V of the cross member 50 that has the flat or substantially flat surface.

According to the vehicle 1 of the present preferred embodiment, as shown in FIG. 6, the hydraulic unit 82 including a first end surface that perpendicularly or substantially perpendicularly intersects the upper middle axis M1 and that is located closer to the cross member movable area V of the cross member 50 than to the front cover 221 is wider than a second end surface that perpendicularly or substantially intersects the upper middle axis M1 and that is located closer to the front cover 221 than to the cross member movable area V of the cross member 50.

According to the configuration described above, of the surfaces of the hydraulic unit 82, since the end surface located closer to the cross member movable area V of the cross member 50 has a wide flat or substantially flat surface and the end surface located closer to the front cover 221 is small, the hydraulic unit is mounted on the vehicle while preventing enlargement of the vehicle.

Second Preferred Embodiment

Figure 8:
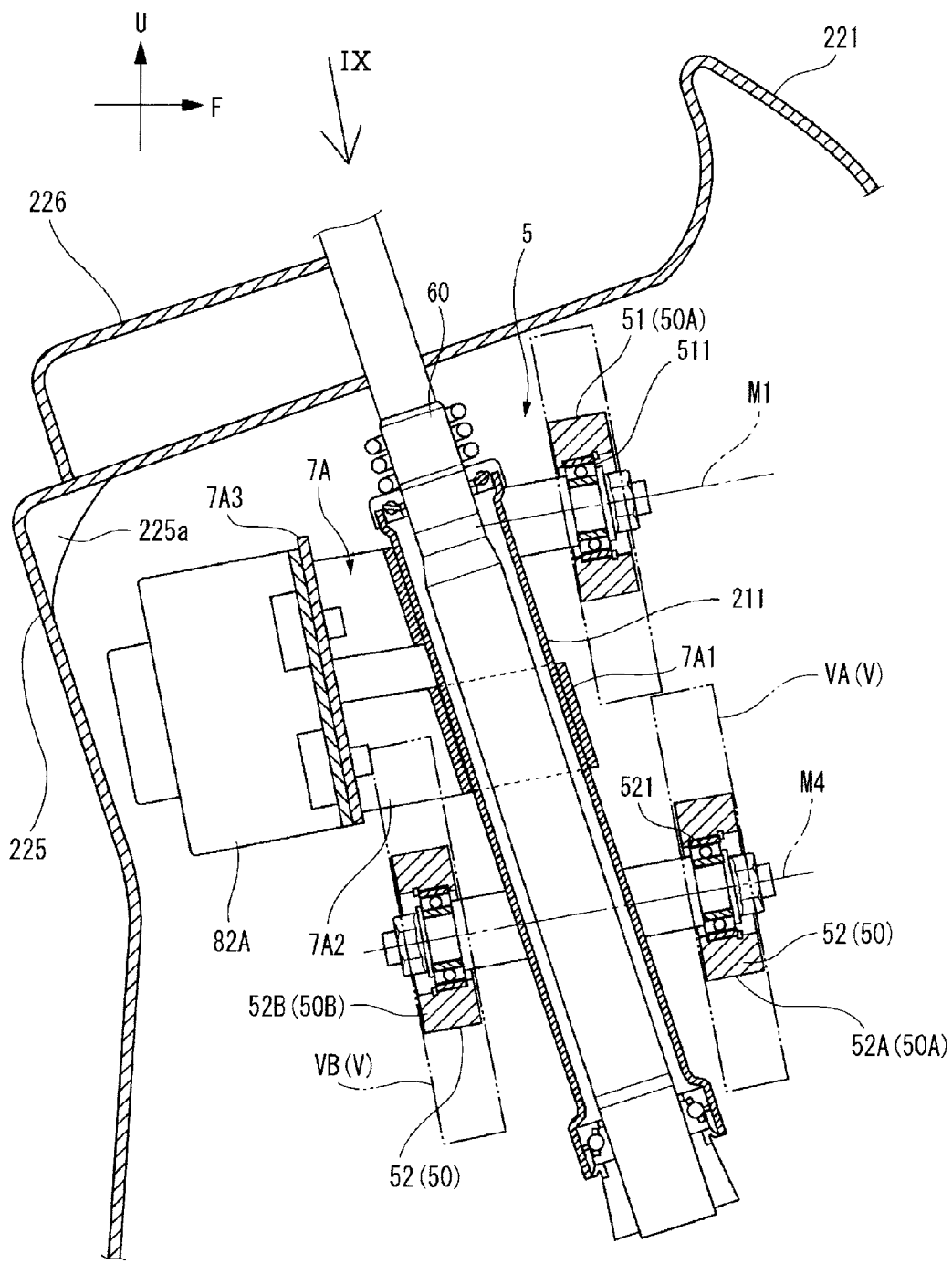
FIG. 8 is a view, similar to FIG. 3, which shows a second preferred embodiment of the present invention.
Figure 9:
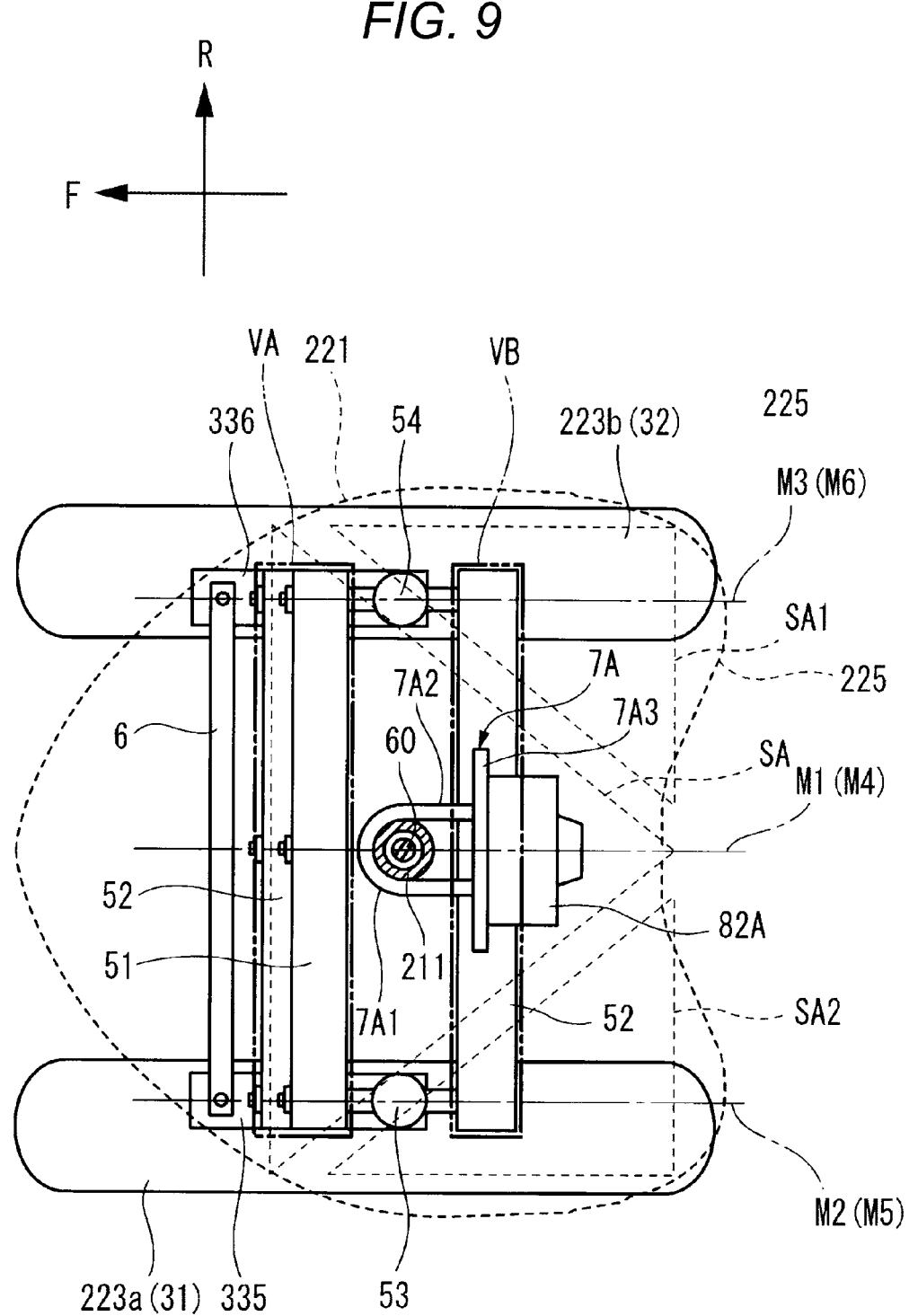
FIG. 9 is a view seen from a direction indicated by an arrow IX in FIG. 8.

Next, a second preferred embodiment of the present invention will be described with reference to FIGS. 8 and 9. In the following description, a feature that differs from the first preferred embodiment that has been described above will be described, and like reference numerals will be given to like configurations to those of the first preferred embodiment, so that the description thereof will be omitted. A vehicle of the second preferred embodiment differs from the vehicle of the first preferred embodiment in that a hydraulic unit 82A is disposed in a different position. FIG. 8 is a view, similar to FIG. 3, which shows the vehicle according to the second preferred embodiment. FIG. 9 is a view seen from a direction indicated by an arrow IX in FIG. 8.

In the vehicle according to the present preferred embodiment, an upper cross member 51 of a link mechanism 5 is provided forward of a headstock 211 in relation to the direction of an upper middle axis M1. The hydraulic unit 82A is provided rearward of the headstock 211 and forward of a leg shield 225. The hydraulic unit 82A is accommodated inside the leg shield 225. The hydraulic unit 82A is smaller than the leg shield 225 when seen from the direction of the upper middle axis M1. In particular, the hydraulic unit 82A is smaller than a cross member movable area V of a cross member 50 that includes the upper cross member 51 and lower cross members 52 where the cross member 50 turns relative to a body frame 21 as seen from the direction of the upper middle axis M1. Additionally, the hydraulic unit 82A is disposed in a position where the hydraulic unit 82A overlaps at least a portion of the cross member movable area V of the cross member 50 and at least a portion of the leg shield 225 as seen from the direction of the upper middle axis M1 and between the cross member movable area V of the cross member 50 and the leg shield 225 in relation to the direction of the upper middle axis M1 and is supported on the headstock 211 of the body frame 21 that supports the link mechanism 5. In the present preferred embodiment, the hydraulic unit 82A is disposed between a cross member movable area VA of a front cross member 50A and the leg shield 225 and between a front movable area VB of a rear cross member 50B and the leg shield 225 in relation to the direction of the upper middle axis M1 and an upper middle axis M4.

The hydraulic unit 82A is supported on the headstock 211 via an attaching bracket 7A fixed to the headstock 211. The attaching bracket 7A includes a fixed portion 7A1, an extending portion 7A2, and an attaching plate portion 7A3. The fixed portion 7A1 is fixed to the headstock 211. The extending portion 7A2 protrudes from the fixed portion 7A1 to a rear side opposite to a side where the upper cross member 51 is provided. The attaching plate portion 7A3 is provided at a rear end of the extending portion 7A2 and extends in the direction of a surface that intersects the upper middle axis M1. The hydraulic unit 82A is attached to the attaching plate portion 7A3.

By using this configuration, similar to the first preferred embodiment that has been described before, the hydraulic unit 82A is disposed so as to avoid the cross member movable area V of the cross member 50. Similar to the first preferred embodiment that has been described above, this enables the hydraulic unit 82A to be mounted on the vehicle with a high rigidity without enlarging a front portion of the vehicle by effectively using a space defined between the link mechanism 5 and the leg shield 225.

In addition, in the present preferred embodiment, too, a link mechanism side supporting length from the headstock 211 to the link mechanism 5 is shorter than a hydraulic unit side supporting length from the headstock 211 to the hydraulic unit 82A. In the present preferred embodiment, too, the link mechanism 5, which is heavier than the hydraulic unit 82A, is supported on the headstock 211 in a position that is located closer to the headstock 211 than to the hydraulic unit 82A. This enhances the rigidity of the link mechanism 5.

In the present preferred embodiment, the headstock 211 is disposed between the link mechanism 5 and the hydraulic unit 82A in relation to the direction of an upper middle axis M1. In other words, the hydraulic unit 82A and the link mechanism 5 are disposed across the headstock 211. By using this configuration, there is no such situation that the hydraulic unit 82A interferes with the link mechanism 5. In particular, it is possible to effectively prevent interference of a brake hose or an electric wiring, not shown, extending from the hydraulic unit 82A with the link mechanism 5.

Further, in the present preferred embodiment, as seen from above in the up-and-down direction of the body frame 21 (a direction indicated by an arrow IX in FIG. 8), as shown in FIG. 9, the link mechanism 5 is larger than the headstock 211 and the hydraulic unit 82. Accordingly, a space SA occupied by the hydraulic unit 82A, the headstock 211, and the link mechanism 5 has a triangular or substantially triangular shape in which the hydraulic unit 82A projects to the rear. By using this configuration, spaces SA1, SA2 on the left and right sides of the hydraulic unit 82A and the headstock 211 are used for other applications. This enhances the degree of freedom in designing the front portion of the vehicle.

Third Preferred Embodiment

Figure 10:
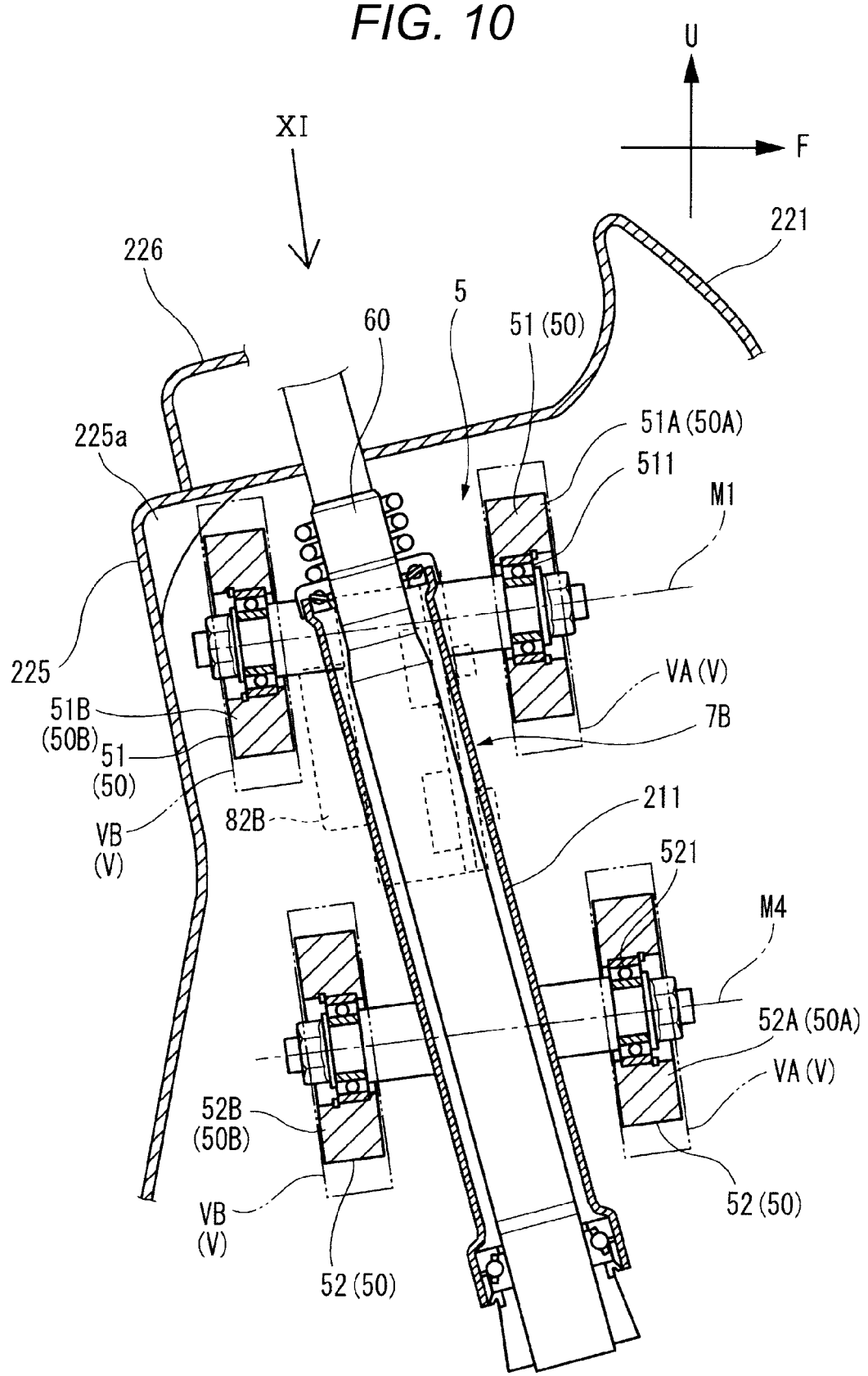
FIG. 10 is a view, similar to FIG. 3, which shows a vehicle according to a third preferred embodiment of the present invention.
Figure 11:
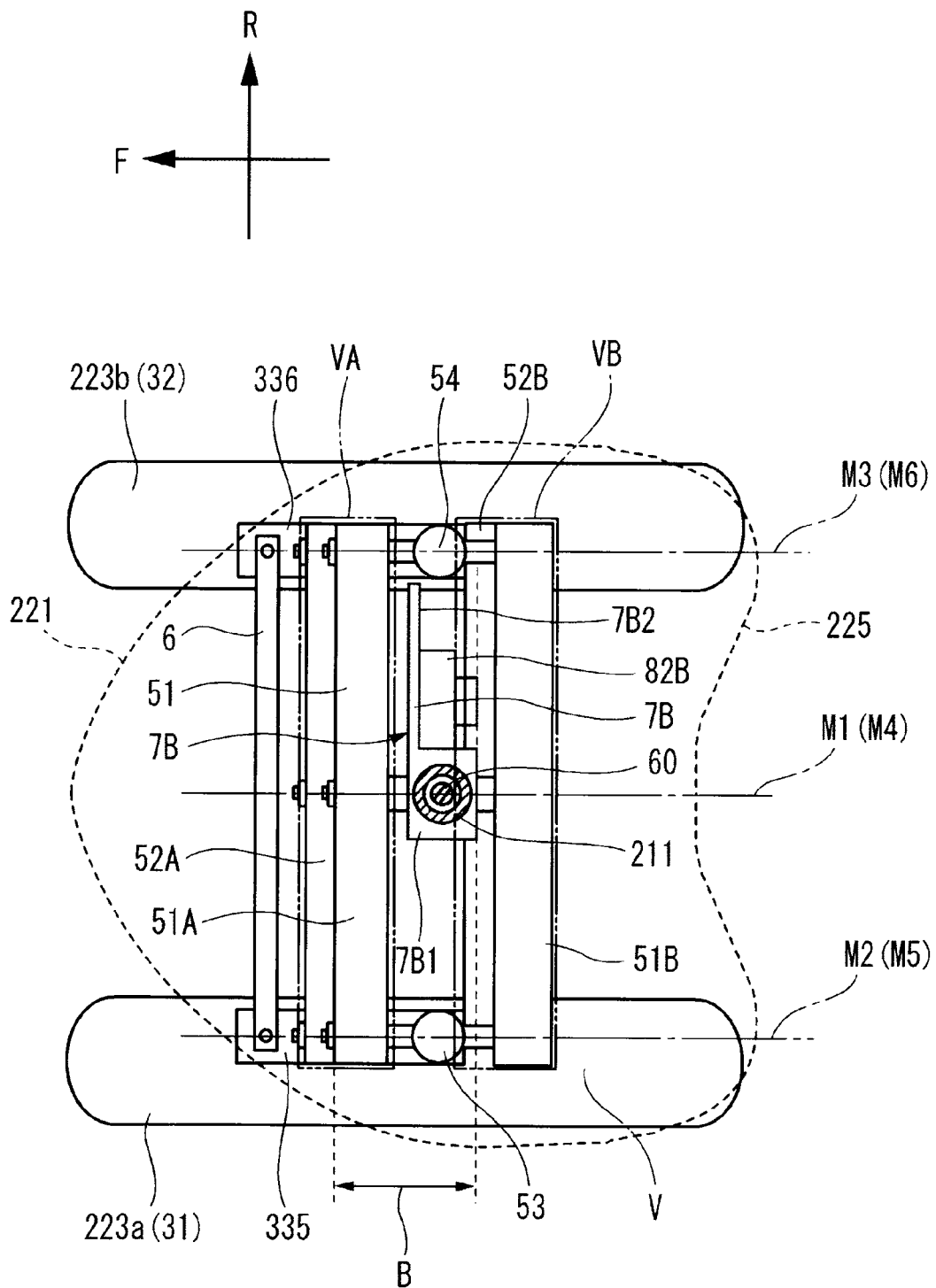
FIG. 11 is a view seen from a direction indicated by an arrow XI in FIG. 10.

Next, a third preferred embodiment of the present invention will be described with reference to FIGS. 10 and 11. In the following description, a feature that differs from the first preferred embodiment that has been described above will be described, and like reference numerals will be given to like configurations to those of the first preferred embodiment, so that the description thereof will be omitted. A vehicle of the second preferred embodiment differs from the vehicle of the first preferred embodiment in that a hydraulic unit 82 is disposed in a different position. FIG. 10 is a view, similar to FIG. 8, which shows the vehicle according to the third preferred embodiment. FIG. 11 is a view, similar to FIG. 9, which shows the vehicle according to the third preferred embodiment.

In the present preferred embodiment, as shown in FIG. 10, the hydraulic unit 82B is disposed in a position where the hydraulic unit 82B overlaps a headstock 211 in relation to the direction of an upper middle axis M1. Additionally, a leg shield 225 is provided behind the hydraulic unit 82A and the headstock 211. The cross member 50 includes an upper cross member 51 and a lower cross member 52. The cross member 50 includes a front cross member 50A that is located forward of the headstock 211 and a rear cross member 50B that is located rearward of the headstock 211. In addition, the upper cross member 51 includes a front upper cross member 51A that is located forward of the headstock 211 and a rear upper cross member 51B that is located rearward of the headstock 211. The lower cross member 52 includes a front lower cross member 52A that is located forward of the headstock 211 and a rear lower cross member 52B that is located rearward of the headstock 211. The front cross portion 50A includes a front upper cross member 51A and a front lower cross member 52A. The rear cross member 50B includes a rear upper cross member 51B and a rear lower cross member 52B.

The hydraulic unit 82B is disposed between the front upper cross member 51A and the rear upper cross member 51B in relation to the upper middle axis M1. The hydraulic unit 82B is disposed between the front upper cross member 51A and the leg shield 225 and between the rear upper cross member 51B and the front cover 221 in relation to the direction of the upper middle axis M1. The hydraulic unit 82B is disposed between the front lower cross member 52A and the leg shield 225 in relation to the upper middle axis M1. The hydraulic unit 82B is disposed between the rear lower cross member 52B and the front cover 221 in relation to the upper middle axis M1.

The hydraulic unit 82B is smaller than a front cross member movable area VA of the front cross member 50A that includes the front upper cross member 51A and the front lower cross member 52A where the front cross member 50A moves relative to the body frame 21 as seen from the direction of the upper middle axis M1. Additionally, the hydraulic unit 82B is disposed in a position where the hydraulic unit 82B overlaps at least a portion of the cross member movable area VA of the front cross member 50A and at least a portion of the leg shield 225 as seen in the direction of the upper middle axis M1. In addition, the hydraulic unit 82B is disposed between the front upper cross member 51A and the leg shield 225 in relation to the direction of the upper middle axis M1 and is supported on the headstock 211 of the body frame 21 that supports the link mechanism 5.

The hydraulic unit 82B is disposed between the front cross member movable area VA of the front cross member 50A that includes the front upper cross member 51A and the front lower cross member 52A where the front cross member 50A moves relative to the body frame 21 and the leg shield 225 in relation to the direction of the upper middle axis M1 and is supported on the headstock 211 of the body frame 21 that supports the link mechanism 5. The hydraulic unit 82B is smaller than a cross member movable area VB of the rear cross member 50B that includes the rear upper cross member 51B and the rear lower cross member 52B where the rear cross member 50B moves relative to the body frame 21 as seen from the direction of the upper middle axis M1. Additionally, the hydraulic unit 82B is disposed in a position where the hydraulic unit 82B overlaps at least a portion of the cross member movable area VB of the rear cross member 50B and at least a portion of the leg shield 225 as seen from the direction of the upper middle axis M1. In addition, the hydraulic unit 82B is disposed between the rear upper cross member 51B and the front cover 221 in relation to the direction of the upper middle axis M1 and is supported on the headstock 211 of the body frame 21 that supports the link mechanism 5. The hydraulic unit 82B is disposed between the cross member movable area VB of the rear cross member 50B that includes the rear upper cross member 51B and the rear lower cross member 52B where the rear cross member 50B moves relative to the body frame 21 and the front cover 221 in relation to the direction of the upper middle axis M1 and is supported on the headstock 211 of the body frame 21 that supports the link mechanism 5.

The hydraulic unit 82B is supported on the headstock 211 via an attaching bracket 7B fixed to the headstock 211. As shown in FIG. 11, the attaching bracket 7B includes a fixed portion 7B1 and an attaching plate portion 7B2. The fixed portion 7B1 is fixed to the headstock 211. The attaching plate portion 7B2 extends from the fixed portion 7A1 in a left-and-right direction of the body frame 21. Additionally, the attaching plate portion 7B2 is a plate member that is parallel or substantially parallel to a surface that intersects the upper middle axis M1 perpendicularly or substantially perpendicularly. The hydraulic unit 82B is attached to the attaching plate portion 7B2.

By using this configuration, as with the first preferred embodiment described above, the hydraulic unit 82B is disposed so as to avoid a space where an operation space of the link mechanism 5 expands when the link mechanism 5 operates. This enables the hydraulic unit 82B to be mounted on the vehicle with a high supporting rigidity without enlarging a front portion of the vehicle by effectively using a space defined between the link mechanism 5 and the front cover 221 or the leg shield 225.

In the present preferred embodiment, as shown in FIG. 11, as seen from above in the up-and-down direction of the body frame 21 (a direction indicated by an arrow IX in FIG. 10), the upper cross member 51 of the link mechanism 5 is larger than the hydraulic unit 82B. The hydraulic unit 82B is disposed to the right of the headstock 211 in the left-and-right direction of the body frame. By using this configuration, the length of a space occupied by the link mechanism 5 and the hydraulic unit 82B is shortened in relation to the direction of the upper middle axis M1. This enhances the degree of freedom of the space at the front portion of the vehicle in relation to the direction of the upper middle axis M1.

Further, as shown in FIG. 11, as seen from above (the direction indicated by the arrow IX in FIG. 8) in the up-and-down direction of the body frame 21, the hydraulic unit 82B is disposed in an interior of a space B occupied by the upper cross member 51 of the link mechanism 5 and the headstock 211 in relation to the direction of an upper middle axis A1. By using this configuration, the length of the space occupied by the upper cross member 51 and the hydraulic unit 82B is further shortened in relation to the direction of the upper middle axis M1. This further enhances the degree of freedom of the space at the front portion of the vehicle in relation to the direction of the upper middle axis M1.

In the present preferred embodiment, the hydraulic unit 82B may, of course, be disposed to the left of the headstock 211 in the left-and-right direction of the body frame 21.

Modified Examples

Thus, while the present invention has been described heretofore by the use of the first preferred embodiment to the third preferred embodiment thereof, the technical scope of the present invention is not limited to the technical scopes descriptively defined in the preferred embodiments. Those skilled in the art to which the present invention pertains will recognize that various alterations or improvements may be made to the preferred embodiments of the present invention.

In the preferred embodiments described above, while the vehicle is described as preferably including a link mechanism that includes the upper cross member 51 and the lower cross member 52, the present invention is not limited thereto. For example, the present invention may be applied to a vehicle that includes a link mechanism including a middle cross member between an upper cross member and a lower cross member.

In addition, in the preferred embodiments and the modified examples, while the upper cross member 51 and the lower cross member 52 preferably are described as including members that extend continuously in the left-and-right direction, the present invention is not limited thereto. For example, the upper cross member and the lower cross member may each include a member that extends rightwards from the headstock 211 and a member that extends leftwards from the headstock 211. As this occurs, those members may be configured so as to turn on a turning axis or may be configured so as to turn on different turning axis. Additionally, the upper cross member and the lower cross member may each include a member divided into two in the left-and-right direction or two or more members. In addition, the members of the link mechanism 5 may each include a linear member or a member having a curved shape or any other appropriate shape.

In addition, while the upper cross member 51 is described as being provided only directly forward of the headstock 211, similar to the lower cross member 52, the upper cross member 51 may include a front upper member and a rear upper cross member that hold the headstock 211 therebetween. In this case, too, when the hydraulic unit 82, 82A, 82B is disposed between either of the front upper cross member and the rear upper cross member and the external vehicle component in relation to the direction of the upper middle axis M1, as has been described above, it is possible to provide a vehicle on which the hydraulic unit 82, 82A, 82B is mounted with a high rigidity without enlarging the vehicle.

In addition, in the preferred embodiments and the modified examples, while the vehicle 1 is described as preferably including the two front wheels 31, 32, the present invention can also be applied to a vehicle including two or more rear wheels.

In the preferred embodiments described above, while the headstock 211 that extends in the up-and-down direction of the body frame 21 is described as preferably being a vertical frame, the present invention is not limited thereto. The vertical frame may also indicate a frame curved in a position along the length thereof so that a portion that supports the link mechanism 5 extends in the up-and-down direction of the body frame 21 and a portion therebelow extends towards the rear. Additionally, the vertical frame indicates not only a frame that extends in a perpendicular or substantially perpendicular direction but also a frame that extends in the up-and-down direction while being inclined in the front-and-rear direction to support the link mechanism. In addition, the vertical frame and the rear frame that extend from the vertical frame to the rear may include an integral member.

In the preferred embodiments described above, while the front cover 221 and the leg shield 225 are described as preferably being external vehicle components, the present invention is not limited thereto. The external vehicle component is a member provided at the front portion of the vehicle so that at least a portion thereof is exposed to the external surface of the vehicle. It is possible to raise as the external vehicle component the body cover 22 including the front cover 221, the leg shield 225 and the like, various lamps including the headlamp 81, direction indicator lamps and the like, and the instrument panel.

The construction that attaches the hydraulic unit 82 to the headstock 211 is not limited to the attaching bracket 7, 7A, 7B. For example, in the second preferred embodiment and the third preferred embodiment that have been described above, the hydraulic unit 82A, 82B is preferably attached directly to the headstock 211. Alternatively, the hydraulic unit 82, 82A, 82B may be attached to a stay that extends from the headstock 211 so as to avoid the operating space of the link mechanism 5. Further, a configuration may also be used in which the hydraulic unit 82 is fixed to the external vehicle component such as the front cover and, further, at least a portion of the load of this external vehicle component is supported by the vertical frame.

In addition, in the preferred embodiments described above, while the position where to dispose the hydraulic unit 82, 82A, 82B is described by using the relationship between the link mechanism 5 and the headstock 211 and the external vehicle component based on the upper middle axis A1 of the upper cross member 51, the same description will also result even when the disposing position is described based on the lower middle axis M4 of the lower cross member 52. The same effect as what has been described above is obtained even when the hydraulic unit 82, 82A, 82B is disposed between the link mechanism 5 and the external vehicle component in relation to the lower middle axis M4.

When referred to in this description, "parallel or substantially parallel" also includes two straight lines inclined within the angular range of about ±40 degrees, for example and that do not intersect each other as members. When used together with a "direction" and a "member" in the present invention, "along" also includes a case where what follows the direction and the member is inclined relative thereto within the angular range of ±40 degrees, for example. When used together with a "direction" in the present invention, "extend" also includes a case where what extends is inclined relative to the direction within the angular range of about ±40 degrees, for example.

Vehicles according to preferred embodiments of the present invention preferably include the body frame that can lean and two front wheels. The number of rear wheels is not limited to one, and hence, may be two. The vehicles may include the body cover that covers the body frame. The vehicles may not include the body cover which covers the body frame. The power unit includes the power source. The power source is not limited to an engine and hence may be an electric motor.

In the preferred embodiments described above, the right side member 53, the left side member 54, and the headstock 211 (the link support portion) are preferably provided in positions where they overlap one another when the body frame 21 is seen from a side thereof. However, when the body frame 21 is seen from the side thereof, the headstock 211 may be provided in a different position from the positions where the right side member 53 and the left side member 54 are provided in relation to the front-and-rear direction. Additionally, angles at which the right side member 53 and the left side member 54 are inclined relative to the up-and-down direction of the body frame 21 may differ from an angle at which the headstock 211 is inclined.

The link support portion (the headstock) may include a single member or a plurality of members. In the case of the link support portion including a plurality of members, the members may be joined together through welding, bonding or the like. Alternatively, the members may be joined together with fastening members such as bolts, rivets or the like.

The upper cross member may include an upper front cross member including a single member, an upper rear cross member including a single member, and a connecting member provided between the upper front and rear cross members and including a plurality of members. In the case of the link support portion including the plurality of members, the members may be joined together through welding, bonding or the like. Alternatively, the members may be joined together with fastening members such as bolts, rivets or the like.

The lower cross portion may include a lower front cross member including a single member, a lower rear cross member including a single member, and a connecting member provided between the lower front and rear cross members and including a plurality of members. In the case of the link support portion including the plurality of members, the members may be joined together through welding, bonding or the like. Alternatively, the members may be joined together with fastening members such as bolts, rivets or the like.

The right side member and the left side member may each include a single member or a plurality of members. In the case of the link support portion including the plurality of members, the members may be joined together through welding, bonding or the like. Alternatively, the members may be joined together with fastening members such as bolts, rivets or the like. The right side member and the left side member may each include a portion disposed forward of the upper cross member or the lower cross member in the front-and-rear direction of the vehicle body frame and a portion disposed rearward of the upper cross member or the lower cross member in the front-and-rear direction of the vehicle body frame. The upper cross member or the lower cross member may be disposed between the portions disposed at the front of the right side member and the left side member and the portions disposed at the rear of the right side member and the left side member.

In the preferred embodiments described above, the body frame preferably includes the link support portion, the connecting member (the upper front and rear frame portions), the down frame (the upper and lower frame portions), and the under frame (the lower front and rear frame portions), and these constituent elements are connected together through welding, for example. However, the body frame of the present invention is not limited to those of the preferred embodiments. The body frame preferably includes the link support portion, the upper front and rear frame portions, the upper and lower frame portions and the lower front and rear frame portions. For example, the body frame may be integral wholly or partially through casting. Additionally, in the body frame, the upper front and rear frame portions and the upper and lower frame portions may include a single member or may include separate members.

In the preferred embodiments described above, an acute angle defined by the turning axis SA of the steering shaft and the up-and-down direction of the body frame coincides with an acute angle defined by the direction in which the right shock absorber and the left shock absorber extend or contract and the up-and-down direction of the body frame. However, the present invention is not limited to the preferred embodiments. For example, the acute angle defined by the turning axis of the steering shaft and the up-and-down direction of the body frame may be smaller or larger than the acute angle defined by the direction in which the right shock absorber and the left shock absorber extend or contract and the up-and-down direction of the body frame.

In addition, in the preferred embodiments described above, the turning axis of the steering shaft and the direction in which the right shock absorber and the left shock absorber extend or contact coincide with each other. However, the present invention is not limited to the preferred embodiments described above. When the vehicle resting in the upright state is seen from a side thereof, the turning axis of the steering shaft and the direction in which the right shock absorber and the left shock absorber extend or contact may be spaced apart from each other in the front-and-rear direction. Additionally, for example, the turning axis of the steering shaft and the direction in which the right shock absorber and the left shock absorber extend or contact may intersect each other.

In the preferred embodiments described above, the right front wheel and the left front wheel are supported so that their upper ends move farther upward than an upper end of the down frame of the body frame. However, the present invention is not limited to the preferred embodiments described above. In the present invention, the right front wheel and the left front wheel may be supported so that their upper ends move upwards as high as or to a height lower than the upper end of the down frame of the body frame in the up-and-down direction of the body frame.

In a preferred embodiment of the present invention, the link mechanism may include a cross member in addition to the upper cross member and the lower cross member. The upper cross member and the lower cross member are so called only from their relative positional relationship in the up-and-down direction. The upper cross member is not necessarily an uppermost cross member of the link mechanism. The upper cross member indicates a cross member that is located higher than a cross member that is located lower thereof. The lower cross member is not necessarily a lowermost cross member of the link mechanism. The lower cross member indicates a cross member that is located lower than a cross member that is located higher thereof. Additionally, the cross member may include two members of a right cross member and a left cross member. In this manner, the upper cross member and the lower cross member may each include a plurality of members as long as they still provide a link function. Further, other cross members may be provided between the upper cross member and the lower cross member. The link mechanism preferably includes the upper cross member and the lower cross member.

The present invention is embodied in many different forms. The disclosure herein should be regarded as providing the preferred embodiments of the principle of the present invention. Based on the understanding that the preferred embodiments described and/or illustrated herein are not intended to limit the present invention thereto, several preferred embodiments are described and illustrated herein.

Several illustrated preferred embodiments of the present invention are described herein. The present invention is not limited to the various preferred embodiments described herein. The present invention can include every preferred embodiment that includes equivalent elements, modifications, deletions, combinations (for example, combinations of the characteristics of the various preferred embodiments), improvements and/or alterations that those skilled in the art to which the present invention pertains can think of. Matters limited by claims should be construed widely based on terms used in the claims and should not be limited to the preferred embodiments described in this description or during the prosecution of this patent application. Those preferred embodiments should be construed as non-exclusive. For example, in this disclosure, such terms as "preferred," "preferable" and "good" are non-exclusive terms and indicate that "it is preferred but does not limit the present invention thereto," "it is preferable but does not limit the present invention thereto" and "it is good but does not limit the present invention thereto," respectively.

This patent application claims priority to Japanese Patent Application No. 2012-278878 filed on Dec. 21, 2012, Japanese Patent Application No. 2012-278879 filed on Dec. 21, 2012, and Japanese Patent Application No. 2013-138481 filed on Jul. 1, 2013, the entire contents of which are incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
   a body frame;
   a left front wheel and a right front wheel disposed in a left and right direction of the body frame when seen from a front of the vehicle and that are configured to be steered;
   a rear wheel disposed behind the left front wheel and the right front wheel;
   a hydraulic brake system provided on any one of the right front wheel, the left front wheel, and the rear wheel;
   a left shock absorbing device that supports the left front wheel at a lower portion thereof and is configured to absorb an upward displacement of the left front wheel in an up-and-down direction of the body frame;
   a right shock absorbing device that supports the right front wheel at a lower portion thereof and is configured to absorb an upward displacement of the right front wheel in the up-and-down direction of the body frame;
   a link mechanism including:
      a right side member that supports an upper portion of the right shock absorbing device so as to turn about a right steering axis that extends in the up-and-down direction of the body frame;
      a left side member that supports an upper portion of the left shock absorbing device so as to turn about a left steering axis parallel or substantially parallel to the right steering axis; and
      a plurality of cross members that support the right side member at right end portions thereof so as to turn about right axes that extend in a front-and-rear direction of the body frame, that support the left side member at left end portions thereof so as to turn about left axes parallel or substantially parallel to the right axes, and supported on a link support portion of the body frame at middle portions thereof so as to turn about middle axes parallel or substantially parallel to the right axes and the left axes;
   an external vehicle component of which at least a portion is disposed forward of or rearward of the link mechanism in the front-and-rear direction of the body frame and that defines at least a portion of an external surface of the vehicle; and
   a hydraulic unit configured to control a braking force of the hydraulic brake system; wherein
   the hydraulic unit is smaller than a cross member movable area where the plurality of cross members move relative to the body frame as seen from a direction of the middle axes, is disposed in a position that overlaps at least a portion of the cross member movable area and at least a portion of the external vehicle component as seen from the direction of the middle axes and between the cross member movable area and the external vehicle component in relation to the direction of the middle axes, and is supported on the link support portion of the body frame that supports the link mechanism.

2. The vehicle according to claim 1, wherein the hydraulic unit is disposed in a position closer to the middle axes than to the left end portions and to the right end portions of the cross members as seen from the direction of the middle axes.

3. The vehicle according to claim 1, wherein the external vehicle component includes an external surface of which a middle portion in the left and right direction of the body frame is located farther forward or rearward than a right portion or a left portion thereof in the front-and-rear direction of the body frame; and
the hydraulic unit is disposed between the cross member movable area and the external surface of the external vehicle component in relation to the direction of the middle axes.

4. The vehicle according to claim 1, wherein the external vehicle component includes an external surface of which a middle portion in the up-and-down direction of the body frame is farther forward or rearward than an upper portion or a lower portion thereof in the front-and-rear direction of the body frame; and
the hydraulic unit is disposed between the cross member movable area and the external surface of the external vehicle component in relation to the direction of the middle axes.

5. The vehicle according to claim 1, wherein the hydraulic unit includes a first end surface that intersects the middle axes and is closer to the cross member movable area than to the external vehicle component, and is wider than a second end surface that intersects the middle axes and is closer to the external vehicle component than to the cross member movable area.

6. The vehicle according to claim 1, wherein the link mechanism includes a tie-rod that turns together with a steering shaft and that transfers a turning motion of the steering shaft to the left front wheel and to the right front wheel; and the hydraulic unit is located above the tie-rod as seen from the direction of the middle axes.

7. The vehicle according to claim 1, wherein a supporting length between the link support portion and the link mechanism is shorter than a supporting length between the hydraulic unit and the link support portion.

8. The vehicle according to claim 1, wherein the link support portion, the link mechanism, and the hydraulic unit are aligned, in this order, in relation to the direction of the middle axes.

9. The vehicle according to claim 1, wherein the hydraulic unit is smaller than the link mechanism as seen from the up-and-down direction of the body frame.

10. The vehicle according to claim 1, wherein the body frame is disposed between the link mechanism and the hydraulic unit in relation to the direction of the middle axes.

11. The vehicle according to claim 10, wherein the link mechanism is larger than the link support portion and the hydraulic unit as seen from the up-and-down direction of the body frame.

12. The vehicle according to claim 1, wherein as seen from the up-and-down direction of the body frame, the link mechanism is larger than the hydraulic unit, and the hydraulic unit is disposed farther leftward or rightward of the body frame than the link support portion.

13. The vehicle according to claim 12, wherein the hydraulic unit is disposed in an interior of an area occupied by the link mechanism and the link support portion in relation to the direction of the middle axes.

14. The vehicle according to claim 2, wherein the hydraulic unit is located on a center line between a center line of the left front wheel and a center line of the right front wheel such that at least a portion of the hydraulic unit overlaps the center line as seen from the direction of the middle axes.

* * * * *